United States Patent
Baek et al.

(10) Patent No.: US 10,551,667 B2
(45) Date of Patent: Feb. 4, 2020

(54) BACKLIGHT UNIT AND DISPLAY DEVICE INCLUDING THE SAME

(71) Applicant: LG ELECTRONICS INC., Seoul (KR)

(72) Inventors: Sangmin Baek, Seoul (KR); Jaeyong Yoo, Seoul (KR); Woosuk Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/639,109

(22) Filed: Jun. 30, 2017

(65) Prior Publication Data

US 2018/0011374 A1    Jan. 11, 2018

(30) Foreign Application Priority Data

Jul. 6, 2016  (KR) ......................... 10-2016-0085751

(51) Int. Cl.
*G02F 1/1335*  (2006.01)
*F21V 8/00*    (2006.01)

(52) U.S. Cl.
CPC ...... *G02F 1/133603* (2013.01); *G02B 6/0011* (2013.01); *G02F 1/133605* (2013.01); *G02F 1/133606* (2013.01); *G02F 1/133608* (2013.01); *G02F 1/133611* (2013.01)

(58) Field of Classification Search
CPC .. G02B 6/0015; G02B 6/0055; G02B 6/0078; G02B 6/0011; G02B 6/0075–008; G02B 6/0023–0031; G02B 6/001; G02B 6/0086–0091; G02F 1/133605; G02F 1/133603; G02F 1/133606; G02F 1/133608; G02F 1/133611
See application file for complete search history.

(56) References Cited

U.S. PATENT DOCUMENTS

| | | | |
|---|---|---|---|
| 7,616,271 B2 * | 11/2009 | Souk | G02B 6/0078 349/62 |
| 8,491,174 B2 * | 7/2013 | Derichs | G02B 6/0011 362/612 |
| 8,894,265 B2 * | 11/2014 | Chang | G02B 6/0068 349/65 |
| 9,057,810 B2 * | 6/2015 | Baek | G02B 6/0068 |

(Continued)

FOREIGN PATENT DOCUMENTS

| | | |
|---|---|---|
| CN | 101097054 A | 1/2008 |
| CN | 103714743 A | 4/2014 |
| WO | WO 2016/043988 A1 | 3/2016 |

*Primary Examiner* — Mariceli Santiago
(74) *Attorney, Agent, or Firm* — Birch, Stewart, Kolasch & Birch, LLP

(57) ABSTRACT

A backlight unit including a frame; a substrate located on one side of the frame; a plurality of light assemblies mounted on the substrate; a light guide plate configured to guide light emitted by the light assembly; and a reflection sheet located between the light guide plate and the frame and configured to reflect light emitted by the plurality of light assemblies. In addition, the light guide plate includes a first block including a plurality of light guide areas configured to emit light emitted by a corresponding first set of light assemblies; and a second block including a plurality of light guide areas configured to emit light emitted by a corresponding second set of light assemblies.

14 Claims, 29 Drawing Sheets

(56) References Cited

U.S. PATENT DOCUMENTS

| | | | |
|---|---|---|---|
| 9,360,701 B2 * | 6/2016 | Momose | G02B 6/0046 |
| 9,389,356 B2 * | 7/2016 | He | G02B 6/0075 |
| 9,958,590 B2 * | 5/2018 | Teragawa | G02B 6/0031 |
| 10,216,054 B2 * | 2/2019 | Ota | G02F 1/1362 |
| 2005/0140848 A1 | 6/2005 | Yoo et al. | |
| 2007/0188677 A1 * | 8/2007 | Souk | G02B 6/0068 349/65 |
| 2008/0030650 A1 * | 2/2008 | Kitagawa | G02B 6/0068 349/65 |
| 2008/0084709 A1 * | 4/2008 | Li | G02B 6/0016 362/616 |
| 2008/0088763 A1 * | 4/2008 | Toriyama | G02B 6/0091 349/58 |
| 2008/0186427 A1 * | 8/2008 | Kim | G02B 6/0061 349/62 |
| 2010/0214331 A1 * | 8/2010 | Pyun | G02B 6/0068 345/697 |
| 2010/0328362 A1 * | 12/2010 | Song | G02B 6/0038 345/690 |
| 2011/0013416 A1 * | 1/2011 | Kim | G02B 6/0038 362/606 |
| 2011/0292683 A1 * | 12/2011 | Choi | G02B 6/0085 362/612 |
| 2012/0300136 A1 * | 11/2012 | Kasai | G02B 6/0078 348/739 |
| 2014/0092625 A1 * | 4/2014 | Lin | G02B 6/005 362/606 |
| 2014/0286052 A1 * | 9/2014 | McCollum | G02B 6/0078 362/613 |
| 2015/0177440 A1 * | 6/2015 | Kim | G02B 6/001 362/606 |
| 2015/0301266 A1 * | 10/2015 | Araki | G02B 6/005 349/65 |
| 2017/0108638 A1 * | 4/2017 | Teragawa | G02B 6/0088 |
| 2017/0176670 A1 * | 6/2017 | McCollum | G02B 6/0078 |

* cited by examiner (a)

(b)

(a)

(b)

(a)

(b)

BACKLIGHT UNIT AND DISPLAY DEVICE INCLUDING THE SAME

This application claims the benefit of Korean Patent Application No. 10-2016-0085751 filed on Jul. 6, 2016, the entire contents of which are incorporated herein by reference for all purposes as if fully set forth herein.

BACKGROUND OF THE INVENTION

Field of the Invention

The present invention relates to a backlight unit and a display device including the same.

Discussion of the Related Art

With the development of the information society, various demands for display devices have been increasing. Various display devices, such as, e.g., liquid crystal displays (LCDs), plasma display panels (PDPs), electroluminescent displays (ELDs), and vacuum fluorescent displays (VFDs), have been studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

In the related art, when a light guide plate is made of glass, it is difficult to implement a lenti shape at an upper surface thereof and thus there is a problem that a local dimming effect is deteriorated.

SUMMARY OF THE INVENTION

Accordingly, one object of the present invention is to address the above-noted and other problems.

In accordance with an aspect of the present invention, a backlight unit includes: a frame; a substrate located within one side of the frame; a light assembly mounted on the substrate; a light guide plate located opposite to the light assembly on the frame; and a reflection sheet located between the light guide plate and the frame, wherein the light guide plate includes a plurality of areas.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
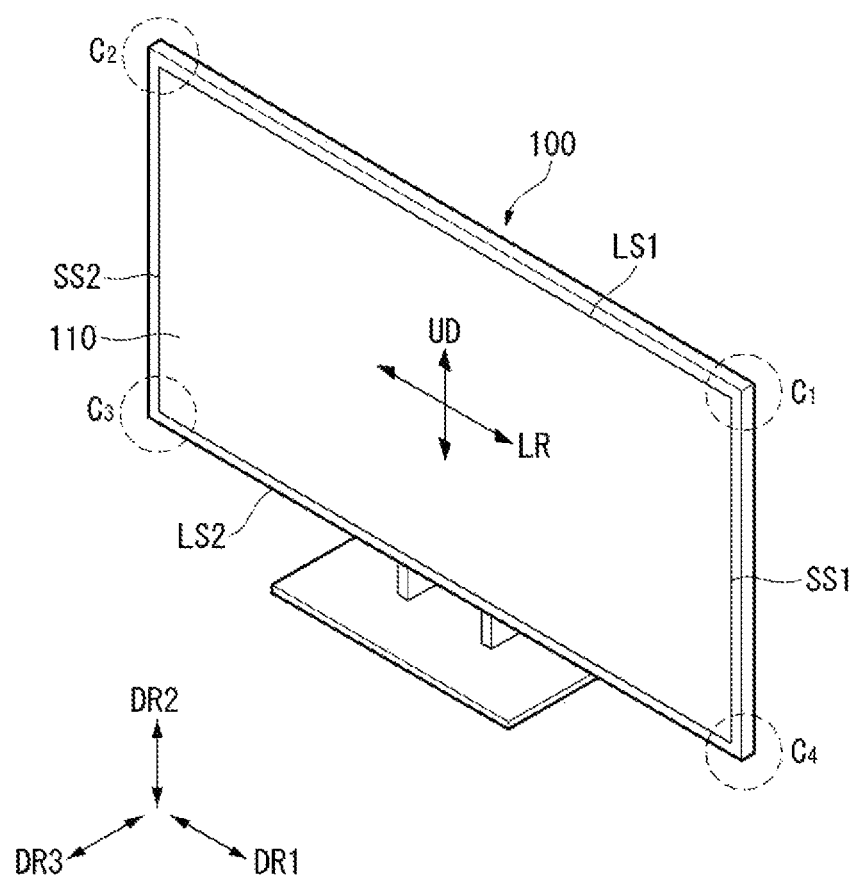
FIGS. 1 to 11 are views illustrating a configuration of a display device according to an embodiment of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component. The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the present invention are provided to those skilled in the art in order to describe the present invention more completely. Accordingly, shapes and sizes of elements shown in the drawings may be exaggerated for clarity.

Hereinafter, the embodiments of the invention are described using a liquid crystal display panel as an example of a display panel. Other display panels may be used. For example, a plasma display panel (PDP), a field emission display (FED) panel, and an organic light emitting diode (OLED) display panel may be used.

FIGS. 1 to 11 are views illustrating a configuration of a display device according to an embodiment of the present invention. As shown in FIG. 1, a display device 100 includes a first long side LS1, a second long side LS2 opposite the first long side LS1, a first short side SS1 adjacent to the first long side LS1 and the second long side LS2, and a second short side SS2 opposite the first short side SS1.

In the embodiment disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

The embodiment of the invention describes that lengths of the first and second long sides LS1 and LS2 are longer than lengths of the first and second short sides SS1 and SS2 for the sake of brevity and ease of reading. However, the lengths of the first and second long sides LS1 and LS2 may be almost equal to the lengths of the first and second short sides SS1 and SS2.

Also, a first direction DR1 is a direction parallel to the long sides LS1 and LS2 of the display device 100, and a second direction DR2 is a direction parallel to the short sides SS1 and SS2 of the display device 100. Further, a third direction DR3 is a direction vertical to the first direction DR1 and/or the second direction DR2.

The first direction DR1 and the second direction DR2 may be commonly referred to as a horizontal direction. Further, the third direction DR3 may be referred to as a vertical direction.

In addition, a side or a surface, on which the display device 100 displays an image, can be referred to as a front side or a front surface. When the display device 100 displays the image, a side or a surface, at which the image cannot be observed, can be referred to as a back side or a back surface. When the display device 100 is observed at the front side or the front surface, the first long side LS1 can be referred to as an upper side or an upper surface. In the same manner as the first long side LS1, the second long side LS2 can be referred to as a lower side or a lower surface. Further, the first short side SS1 can be referred to as a left side or a left surface, and the second short side SS2 may be referred to as a right side or a right surface.

Further, the first long side LS1, the second long side LS2, the first short side SS1, and the second short side SS2 can be referred to as edges of the display device 100. Positions where the first long side LS1, the second long side LS2, the first short side SS1, and the second short side SS2 meet one another can be referred to as corners. For example, a position where the first long side LS1 and the first short side SS1 meet each other can be referred to as a first corner C1; a position where the first long side LS1 and the second short side SS2 meet each other can be referred to as a second corner C2; a position where the second short side SS2 and the second long side LS2 meet each other can be referred to as a third corner C3; and a position where the second long side LS2 and the first short side SS1 meet each other can be referred to as a fourth corner C4.

In addition, a direction from the first short side SS1 to the second short side SS2 or a direction from the second short side SS2 to the first short side SS1 can be referred to as a left-right direction LR. A direction from the first long side LS1 to the second long side LS2 or from the second long side LS2 to the first long side LS1 can be referred to as an up-down direction UD.

Figure 2:
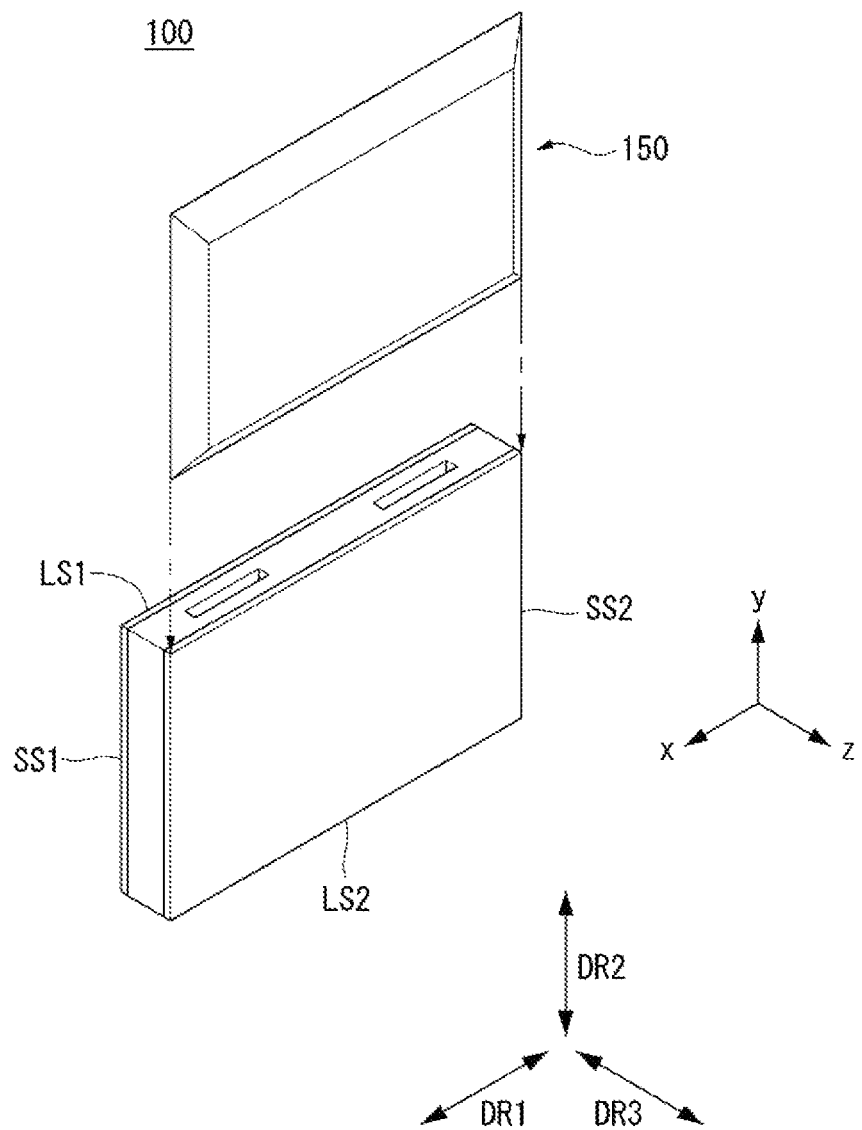

As shown in FIG. 2, the display device 100 includes a display panel 110 and a back cover 150 of the rear side of the display panel 110. The back cover 150 may be connected to the display panel 110 with a sliding method in a direction toward the second long side LS2 from the first long side LS1, i.e., in the second direction DR2. In other words, the back cover 150 can be inserted with a sliding method into the first short side SS1 of the display panel 110, the second short side SS2 corresponding to the first short side SS1, and the first long side LS1 adjacent to the first short side SS1 and the second short side SS2 and located between the first short side SS1 and the second short side SS2.

In order to connect the back cover 150 to the display panel 110 with a sliding method, in the back cover 150 and/or other structures adjacent thereto, a protruding portion, a sliding portion, and a coupler may be included.

Figure 3:
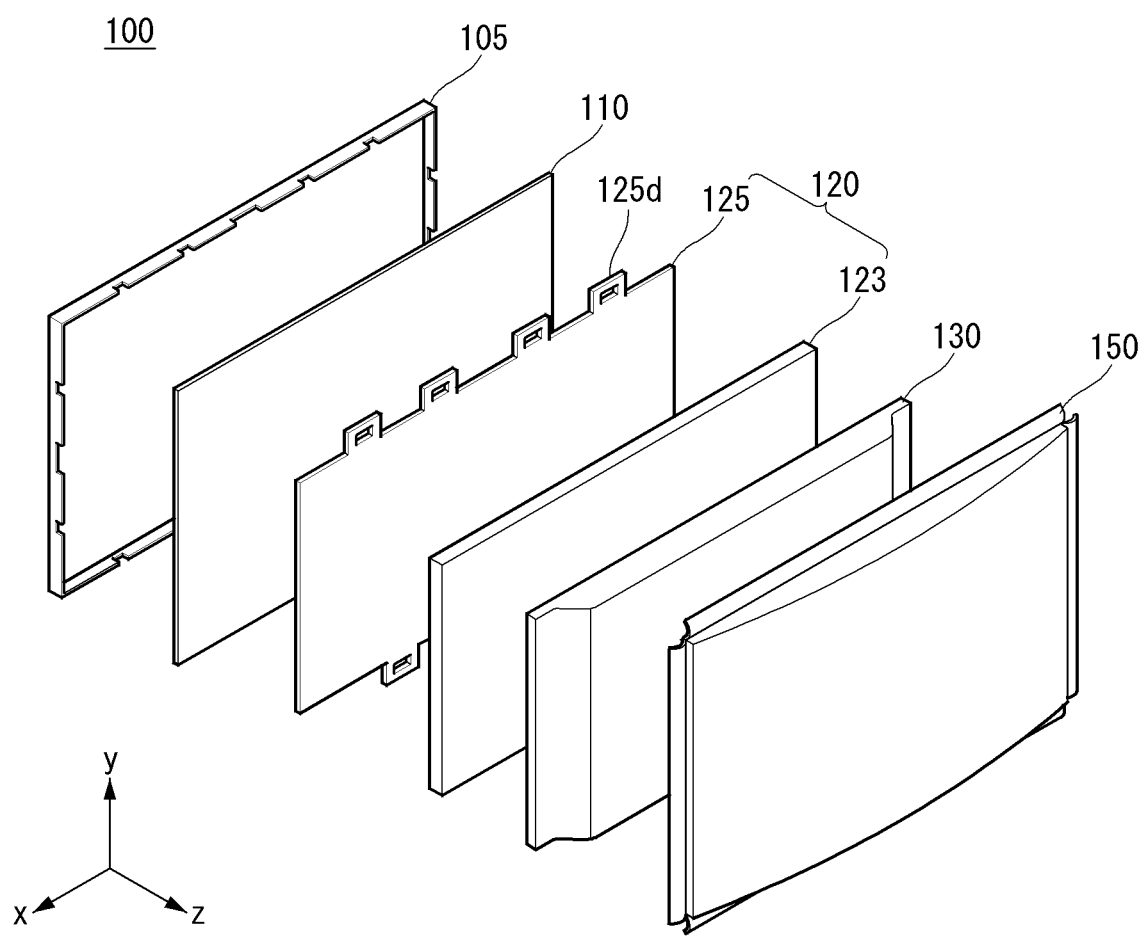

As shown in FIG. 3, the display device 100 includes a front cover 105, a display panel 110, a backlight unit 120, a frame 130, and a back cover 150. The front cover 105 covers at least a partial area of a front surface and a side surface of the display panel 110. The front cover 105 has a quadrangular frame shape whose center is hollow. Because the center of the front cover 105 is hollow, an image of the display panel 110 is displayed to the outside.

The front cover 105 may be divided into a front surface cover and a side surface cover. That is, the front cover 105 may be divided into a front surface cover located at the front surface side of the display panel 110 and a side surface cover located at the side surface side of the display panel 110. The front surface cover and the side surface cover may also be separately formed, and any one of the front surface cover and the side surface cover can be omitted. For example, for an enhanced design, only the side surface cover may exist without the front surface cover.

The display panel 110 is provided at a front surface of the display device 100 to display an image. The display panel 110 can divide an image into a plurality of pixels to output the image to correspond to a color, brightness, and chroma per each pixel. The display panel 110 is also divided into an active area that displays an image and an inactive area that does not display an image. The display panel 110 includes a front substrate and rear substrate opposite to each other with a liquid crystal layer interposed therebetween.

Further, the front substrate may include a plurality of pixels formed with red R, green G, and blue B sub pixels and generates an image corresponding to a red color, a green color, or a blue color according to a control signal. The rear substrate may include switching elements and switches a pixel electrode. For example, the pixel electrode can change molecule arrangement of the liquid crystal layer according to a control signal applied from the outside.

In addition, the liquid crystal layer includes a plurality of liquid crystal molecules that change arrangement to correspond to a voltage difference that has occurred between a pixel electrode and a common electrode. Thus, the liquid crystal layer can transfer light provided from the backlight unit 120 to the front substrate.

Further, the backlight unit 120 is located at the rear surface side of the display panel 110 and includes a plurality of light sources. A light source of the backlight unit 120 may be disposed in a direct type or an edge type. When the backlight unit 120 is the direct type backlight unit 120, a diffusion plate may be further included.

The backlight unit 120 may be coupled to a front surface and a side surface of the frame 130. For example, a plurality of light sources may be disposed at the inside of one side of the frame 130, and in this instance, the backlight unit can be referred to as an edge type backlight unit.

In addition, the backlight unit 120 may be driven with an entire driving method or a partial driving method such as local dimming and impulsive. As shown in FIG. 3, the backlight unit 120 may include an optical sheet 125 and an optical layer 123.

In particular, the optical sheet 125 enables light of a light source to be uniformly transferred to the display panel 110. The optical sheet 125 may be formed with a plurality of layers such as at least one prism sheet and/or at least one diffusion sheet.

In the optical sheet 125, at least one coupler 125d may exist. The coupler 125d can be coupled to the front cover 105 and/or the back cover 150. That is, the coupler 125d can be directly coupled to the front cover 105 and/or the back cover 150. Alternatively, the coupler 125d can be coupled to a structure coupled on the front cover 105 and/or the back cover 150. That is, the coupler 125d can be indirectly coupled to the front cover 105 and/or the back cover 150. Further, the optical layer 123 may include a light source. A detailed configuration of the optical layer 123 will be described later.

The frame 130 supports constituent elements of the display device 100. For example, constituent elements of the backlight unit 120 can be coupled to the frame 130. The frame 130 may be made of a metal material such as an aluminum alloy.

In addition, the back cover 150 is located at a rear surface of the display device 100 and protects internal constituent elements from an external impact. At least a portion of the back cover 150 can be coupled to the frame 130 and/or the front cover 105. The back cover 150 may also be an injection material made of a resin material.

Figure 4:
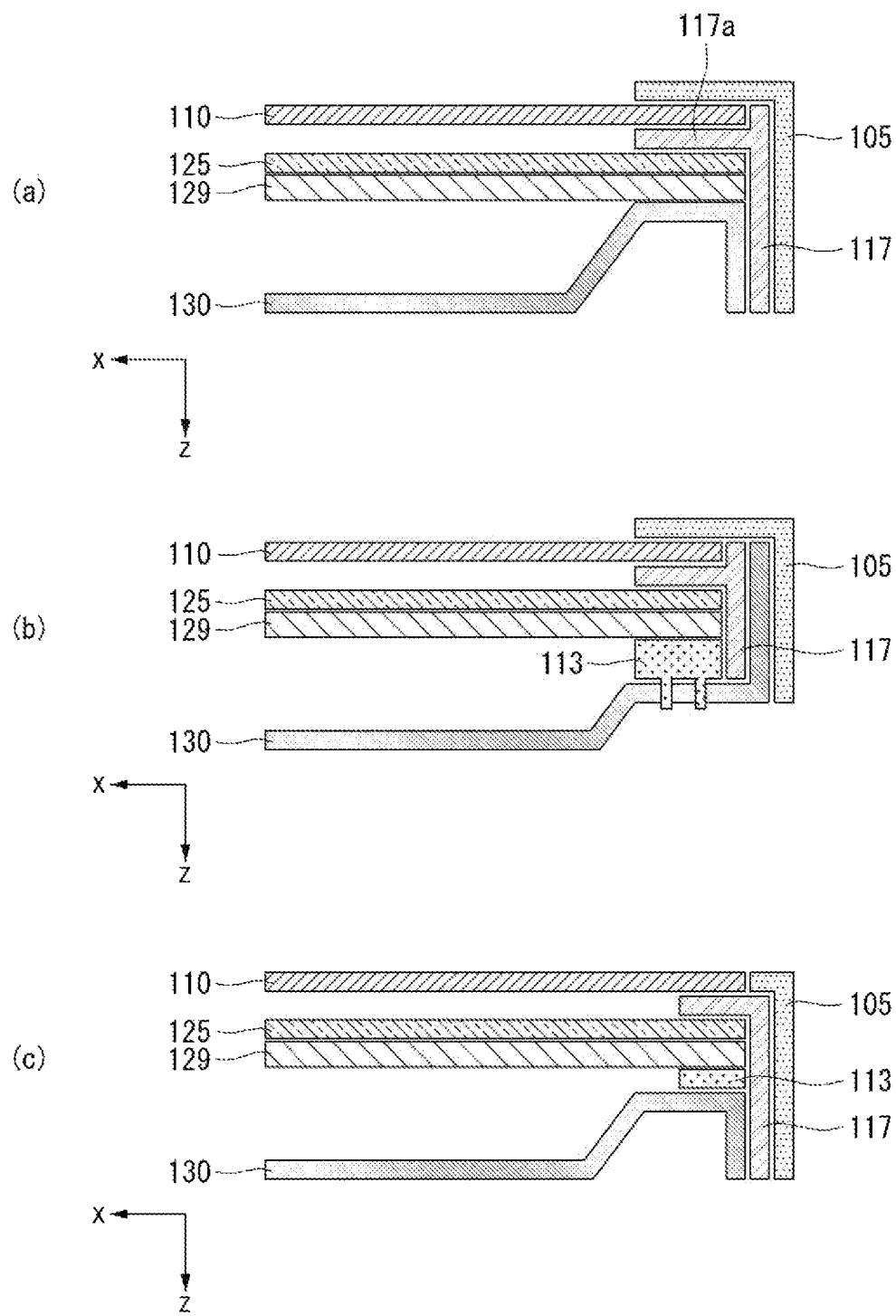
Figure 5:
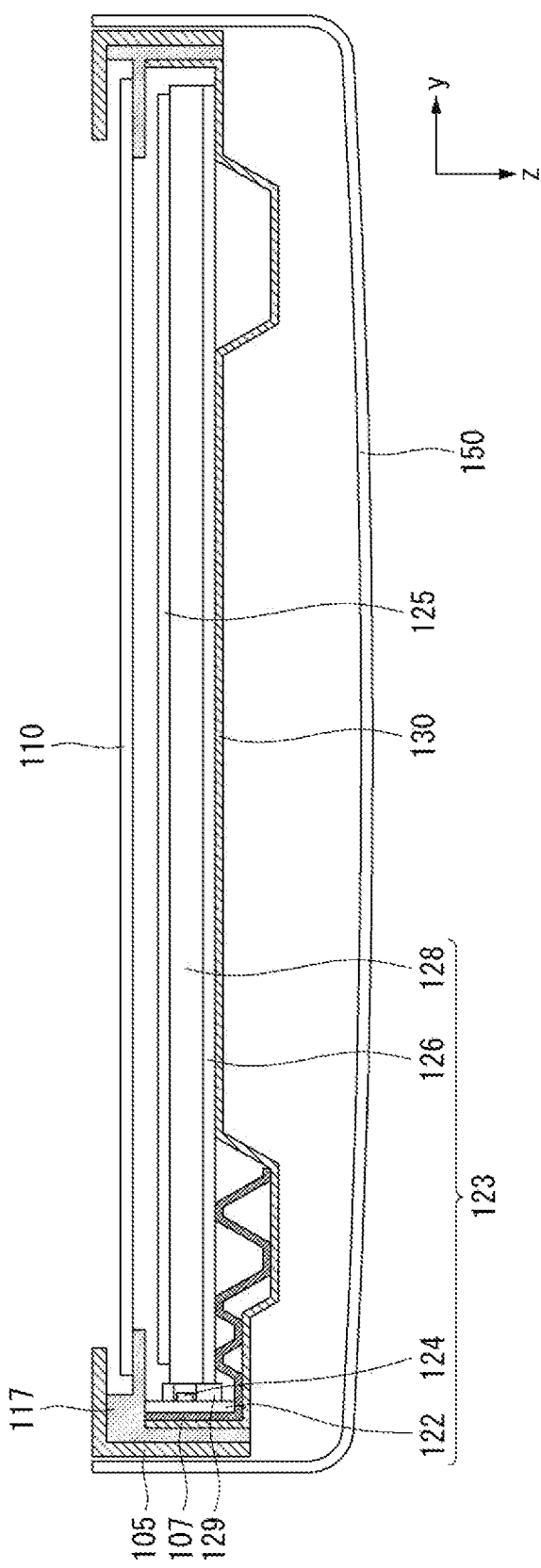
Figure 6:
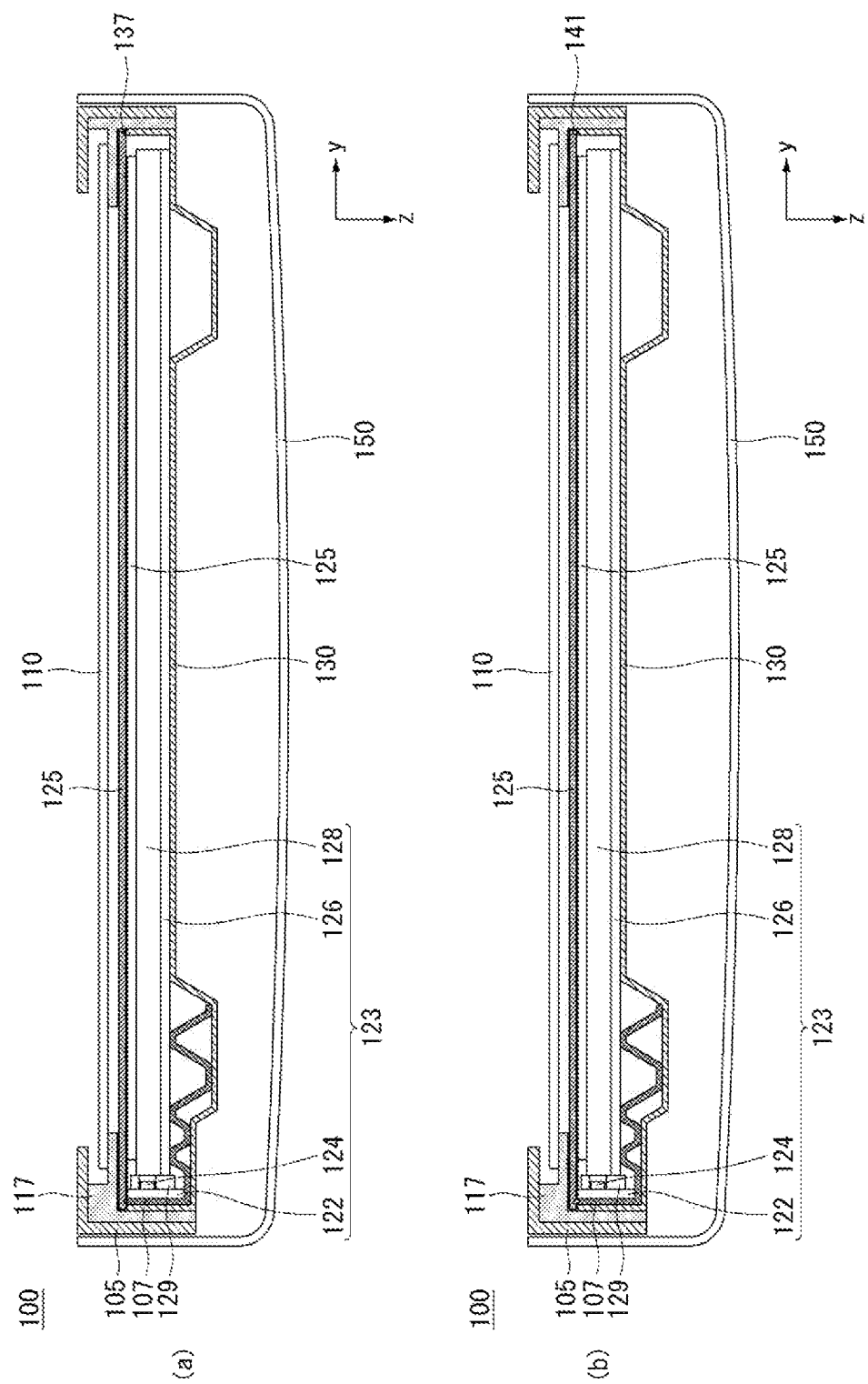

Next, FIGS. 4 and 5 are views illustrating a configuration of the optical sheet 125. As shown in FIG. 4(a), the optical sheet 125 may be located at an upper portion of the frame 130. The optical sheet 125 can be coupled to the frame 130 at an edge of the frame 130. The optical sheet 125 can also be directly received at an edge of the frame 130. That is, the optical sheet 125 can be supported by the frame 130. Further, an upper surface of an edge of the optical sheet 125 can be enclosed by a first guide panel 117. For example, the optical sheet 125 may be located between an edge of the frame 130 and a flange 117a of the first guide panel 117.

In addition, the display panel 110 can be located at the front surface side of the optical sheet 125. An edge of the display panel 110 may be coupled to the first guide panel 117. That is, the display panel 110 may be supported by the first guide panel 117.

An edge area of the front surface of the display panel 110 can be enclosed by the front cover 105. For example, the display panel 110 can be located between the first guide panel 117 and the front cover 105.

As shown in FIG. 4(b), the display device 100 may further include a second guide panel 113. Thus, the optical sheet 125 can be coupled to the second guide panel 113. That is, the second guide panel 113 can be coupled to the frame 130, and the optical sheet 125 can be coupled to the second guide panel 113. The second guide panel 113 can be made of a material different from that of the frame 130. The frame 130 may have a form that encloses the first and second guide panels 117 and 113.

As shown in FIG. 4(c), in the display device 100 according to an embodiment of the present invention, the front cover 105 does not cover a front surface of the display panel 110. That is, one end portion of the front cover 105 can be located at a side surface of the display panel 110.

As shown in FIG. 5, the optical layer 123 may include a substrate 122, a reflection sheet 126, a light assembly 124, and a light guide plate 128. The optical layer 123 can be located on the frame 130. For example, the optical layer 123 can be located between the frame 130 and the optical sheet 125. The optical layer 123 can be supported by the frame 130. In order to support the optical layer 123, at least one portion of the frame 130 may contact the optical layer 123.

At least another portion of the frame 130 can be bent to protrude in an opposite direction of the optical layer 123. For example, both sides of the frame 130 can be protruded in an opposite direction of the optical layer 123. That is, the frame 130 can be formed. Accordingly, the rigidity of the frame 130 can be enhanced.

The substrate 122 can be located in at least one side of the inside of the frame 130. The substrate 122 can be coupled to a housing 107 located between the substrate 122 and the frame 130. The substrate 122 can be directly coupled to the housing 107. For example, the substrate 122 may have a form coupled to at least one of the first guide panel 117, the frame 130, the front cover 105, and the housing 107.

The housing 107 can be located at one side to which the substrate 122 is coupled within the frame 130. In addition, the housing 107 can be bent at least one time from one side of the frame 130 to be extended to a lower surface within the frame 130. A portion extended to a lower surface of the housing 107 can also support the reflection sheet 126. For example, a portion extended to a lower surface of the housing 107 may support one side of the reflection sheet 126, and the frame 130 may support a central portion of the reflection sheet 126. A portion extended to a lower surface of the housing 107 can be bent to protrude in a direction of the reflection sheet 126 in order to support the reflection sheet 126.

The substrate 122 can be located in a side surface direction of the reflection sheet 126 and/or the light guide plate 128. That is, a front surface of the substrate 122 may face toward the optical layer 123. On the substrate 122, the light assembly 124 can be mounted. The light assembly 124 can be located in a side surface direction of the light guide plate 128. That is, light emitted from the light assembly 124 advances toward the light guide plate 128.

Further, the substrate 122 and the reflection sheet 126 and/or the light guide plate 128 can be separated by a predetermined gap. The light assembly 124 and the reflection sheet 126 and/or the light guide plate 128 can also be separated by a predetermined gap. The light assembly 124 can be separated from the reflection sheet 126 and/or the light guide plate 128 by a dam pad 129 located on the substrate 122. That is, a height of the light assembly 124 in a direction of the light guide plate 128 can be lower than that of the dam pad 129 in a direction of the light guide plate 128. Because the light assembly 124 is separated from the reflection sheet 126 and/or the light guide plate 128, the light assembly 124 does not erroneously operate or a function thereof is not weakened. A detailed configuration of the substrate 122 and the optical layer 123 is described later.

In addition, the optical sheet 125 is located between the optical layer 123 and the display panel 110 and can be guided on the optical layer 123 by the first guide panel 117. As discussed above, the optical sheet 125 can be coupled to a rear surface of the flange 117a of the first guide panel 117.

As shown, the display panel 110 is located at a front surface of the optical sheet 125, and a location of the display panel 110 can be guided by the first guide panel 117. The display panel 110 can be coupled to a front surface of the flange 117a of the first guide panel 117.

As shown in FIG. 6(a), in the display device 100 according to an embodiment of the present invention, the optical sheet 125 can be coupled and fixed to the frame 130. Specifically, the optical sheet 125 can be coupled and fixed to a fixing portion 137 of the frame 130.

In more detail, the fixing portion 137 can be provided at a side wall of the frame 130 and protruded from the side wall of the frame 130 in a direction toward an optical sheet. The fixing portion 137 located at both side walls of the frame 130 can fix both sides of the optical sheet 125.

As shown in FIG. 6(b), the frame 130 and the optical sheet 125 can be coupled and fixed through a mold 141. That is, the mold 141 can be coupled to a side wall of the frame 130, and the optical sheet 125 can be coupled to the mold 141. As the optical sheet 125 is directly coupled to the frame 130 instead of the first guide panel 117, the optical sheet 125 can be more strongly fixed to a front surface of the optical layer 123.

Figure 7:
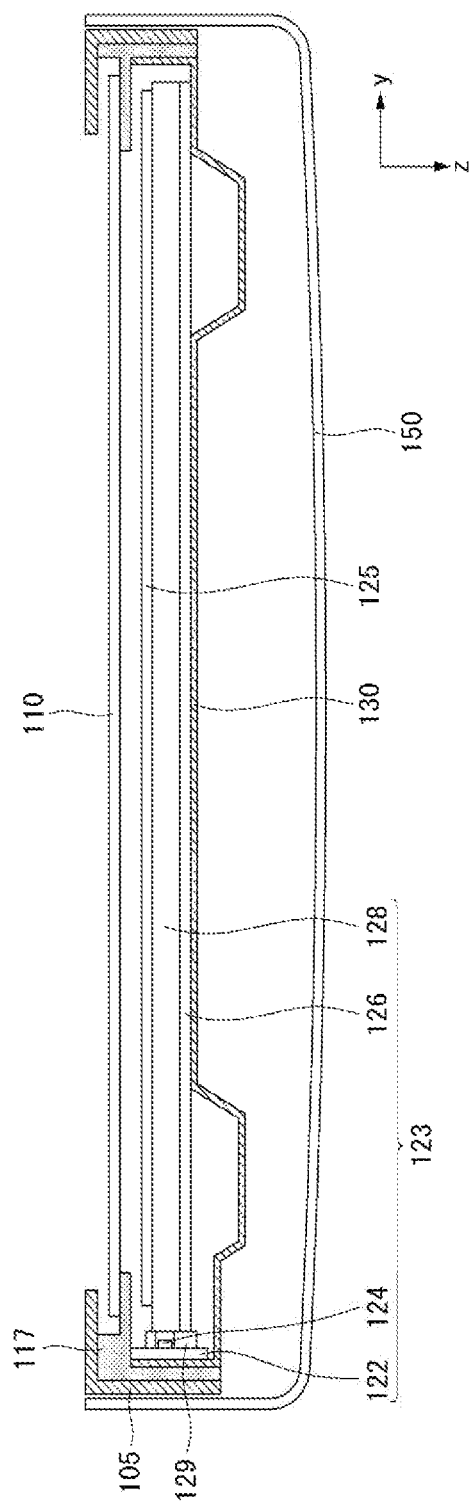

Referring to FIG. 7, the substrate 122 can be directly coupled on the frame 130. Because the frame 130 is directly coupled to the substrate 122, the frame 130 can support both sides of the optical layer 123. In order to support the reflection sheet 126, a portion of the frame 130 corresponding to both ends of the reflection sheet 126 of a lower surface of the frame 130 can be protruded in a direction of the reflection sheet 126. Because the frame 130 and the substrate 122 are directly coupled without an intermediate material therebetween, there is a merit that the frame 130 can more widely use an internal space.

Figure 8:
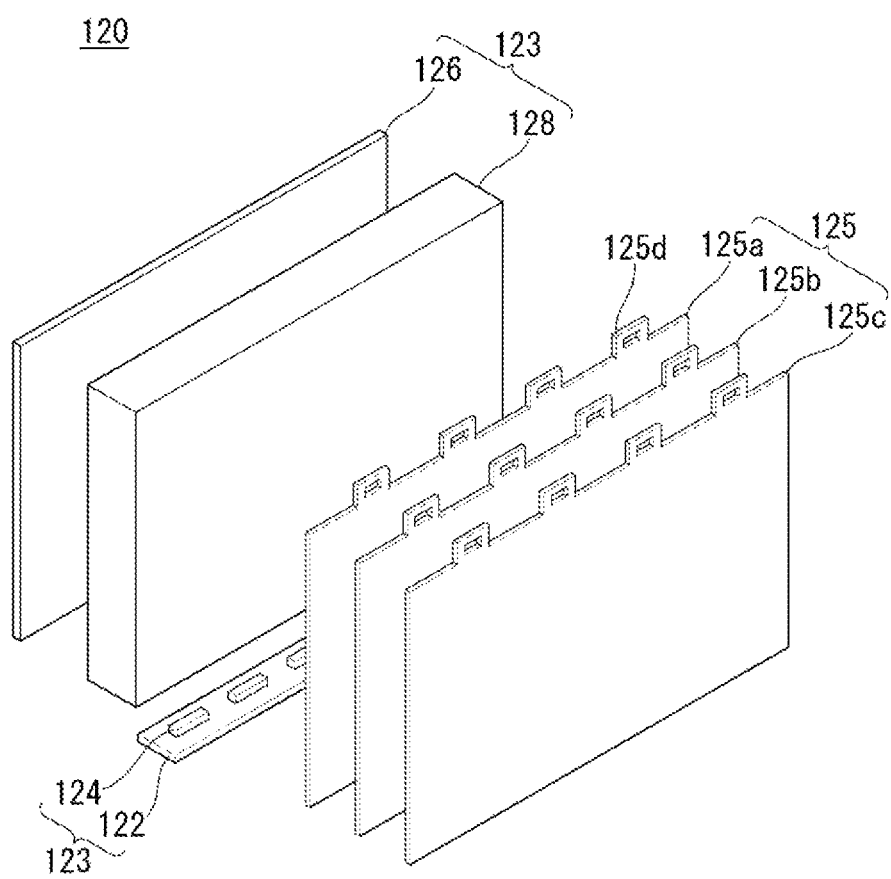
Figure 9:
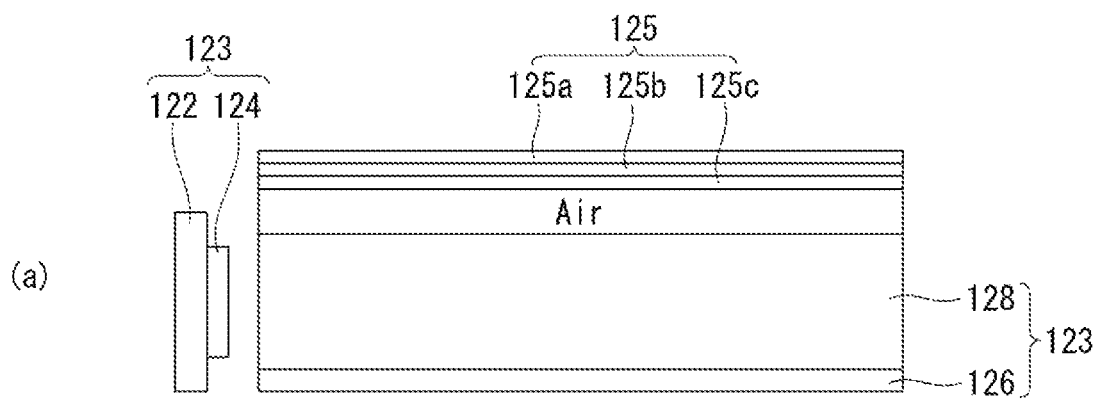
Figure 9:
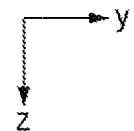
Figure 9:
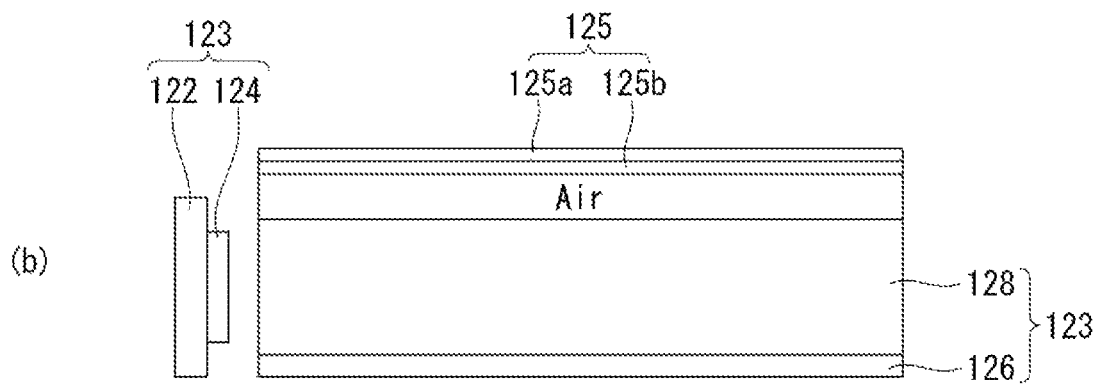
Figure 9:
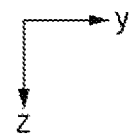

Referring to FIGS. 8 and 9, the backlight unit 120 includes a substrate 122, at least one light assembly 124, an optical layer 123 including a reflection sheet 126 and a light guide plate 128, and an optical sheet 125 located at the front surface side of the optical layer 123. The substrate 122 can be located in at least one side of another configuration of the optical layer 123 and can be extended in a direction orthogonal to a lengthwise direction of another configuration of the optical layer 123.

At least one light assembly 124 is mounted on the substrate 122. In the substrate 122, an electrode pattern for connecting an adaptor and the light assembly 124 can be formed. For example, in the substrate 122, a carbon nanotube electrode pattern for connecting the light assembly 124 and the adaptor can be formed.

The substrate 122 can be made of at least one of polyethyleneterephthalate (PET), glass, polycarbonate (PC), and silicon. The substrate 122 can be a Printed Circuit Board (PCB) that mounts at least one light assembly 124. In the substrate 122, the light assembly 124 can be disposed at a predetermined gap. Further, a lengthwise direction width of the light assembly 124 can be smaller than a thickness direction width of the light guide plate 128. Therefore, most light emitted from the light assembly 124 can be transferred to the inside of the light guide plate 128.

In addition, the light assembly 124 can be a Light Emitting Diode (LED) chip or an LED package including at least one LED chip. The light assembly 124 can be formed with a color LED that emits at least one of a red color, a blue color, and a green color or a white LED. The color LED may include at least one of a red LED, a blue LED, and a green LED.

A light source included in the light assembly 124 can be a Chip On Board (COB) type light source. The COB type light source may have a form that directly couples an LED chip, which is a light source to the substrate 122. Therefore, a process can be simplified. Further, resistance can be lowered and thus energy to be lost due to a heat can be reduced. That is, the power efficiency of the light assembly 124 can be enhanced. Further, the COB type light source can provide more bright lighting and can be implemented in a smaller thickness and a lighter weight than a related art light source.

In addition, the light guide plate 128 can be located at an upper portion of the light assembly 124 and widely diffuse light applied from the light assembly 124. Further, in the light guide plate 128, the light assembly 124 and an adjacent surface can be formed in a step shape. A lower surface of the light guide plate 128 is also formed in a shape inclined upward to reflect light applied from the light assembly 124 upward.

In addition, the reflection sheet 126 can be located at the rear surface side of the light guide plate 128 and reflects light emitted from the light assembly 124 to the front surface side. The reflection sheet 126 also reflects again light reflected from the light guide plate 128 to the front surface side. Also, the reflection sheet 126 may include at least one of a metal and metal oxide, which are a reflection material. For example, the reflection sheet 126 may include a metal and/or metal oxide having high reflectivity, such as at least one of aluminum (Al), silver (Ag), gold (Au), and titanium dioxide (TiO2).

The reflection sheet 126 can be formed by depositing and/or coating a metal or metal oxide. On the reflection sheet 126, ink including a metal material can be printed. In the reflection sheet 126, a deposition layer can be formed using a vacuum deposition method such as a heat deposition method, an evaporation method, or a sputtering method. Further, a coating layer and/or a print layer can be formed on the reflection sheet 126 using a printing method, a gravure coating method, or a silk screen method.

At the front surface side of the light guide plate 128, a diffusion plate can be further included to diffuse light emitted from the light guide plate 128 upward. An air gap can also be formed between the light guide plate 128 and the optical sheet 125. In particular, the air gap can perform a buffer function of widely spreading light emitted from the light assembly 124. A resin can be deposited on the light assembly 124 and/or the reflection sheet 126 and diffuse light emitted from the light assembly 124.

In addition, the optical sheet 125 can be located at the front surface side of the light guide plate 128. A rear surface of the optical sheet 125 may come in close contact with the light guide plate 128, and a front surface of the optical sheet 125 may come in close contact with a rear surface of the display panel 110. The optical sheet 125 may include at least one prism sheet and/or at least one diffusion sheet. A plurality of sheets included in the optical sheet 125 can be in a bonding state and/or a close contact state.

Further, the optical sheet 125 can be formed with a plurality of sheets having different functions. For example, the optical sheet 125 may include first to three optical sheets 125a to 125c. The first optical sheet 125a can have a function of a diffusion sheet, and the second and third optical sheets 125b and 125c can have a function of a prism sheet. The number and/or a location of diffusion sheets and prism sheets can be changed. For example, the optical sheet 125 may include the first optical sheet 125a, which is a diffusion sheet and the second optical sheet 125b, which is a prism sheet.

The diffusion sheet prevents light emitted from the light guide plate 128 from partially concentrating, thereby more uniformly making luminance of light. In addition, the prism sheet concentrates light emitted from the diffusion sheet to enable light to be vertically applied to the display panel 110.

Also, the coupler 125d can be formed in at least one of corners of the optical sheet 125. The coupler 125d can be formed in at least one of the first to third optical sheets 125a to 125c. The coupler 125d can also be formed at a corner of the long side of the optical sheet 125. The coupler 125d formed at the first long side and the coupler 125d formed at the second long side can be asymmetric. For example, a location and/or the number of the coupler 125d formed at the first long side and the coupler 125d formed at the second long side can be different.

Figure 10:
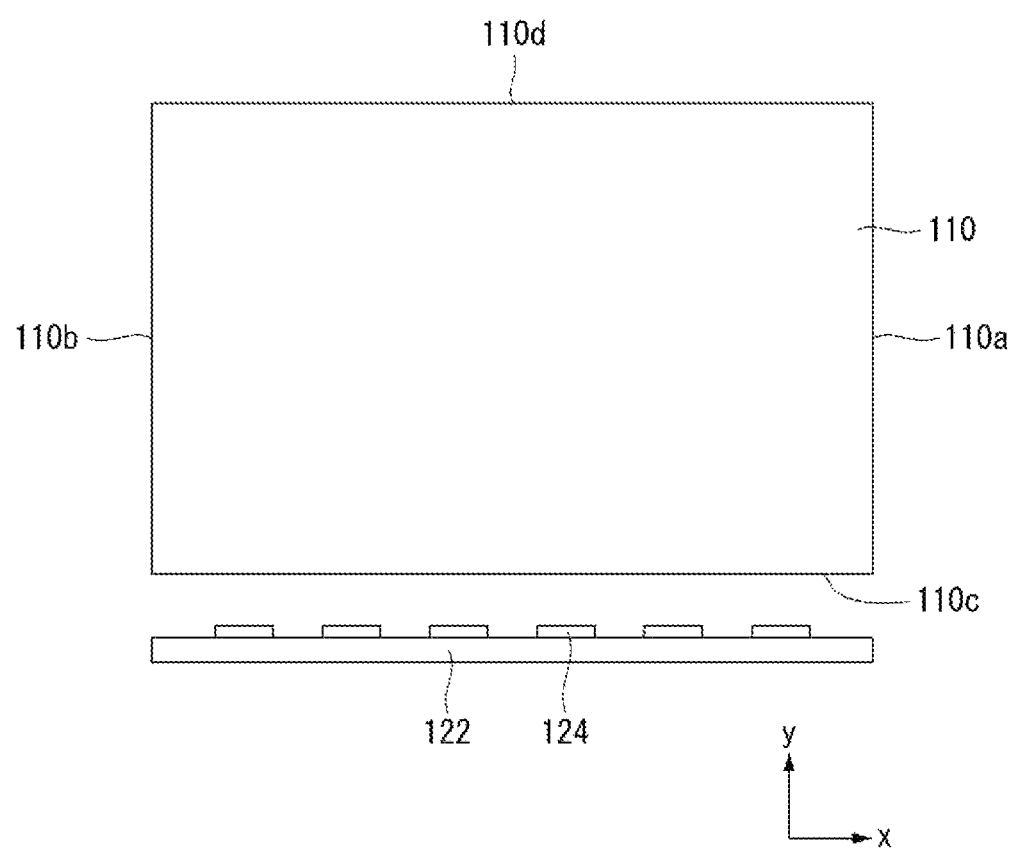
Figure 11:
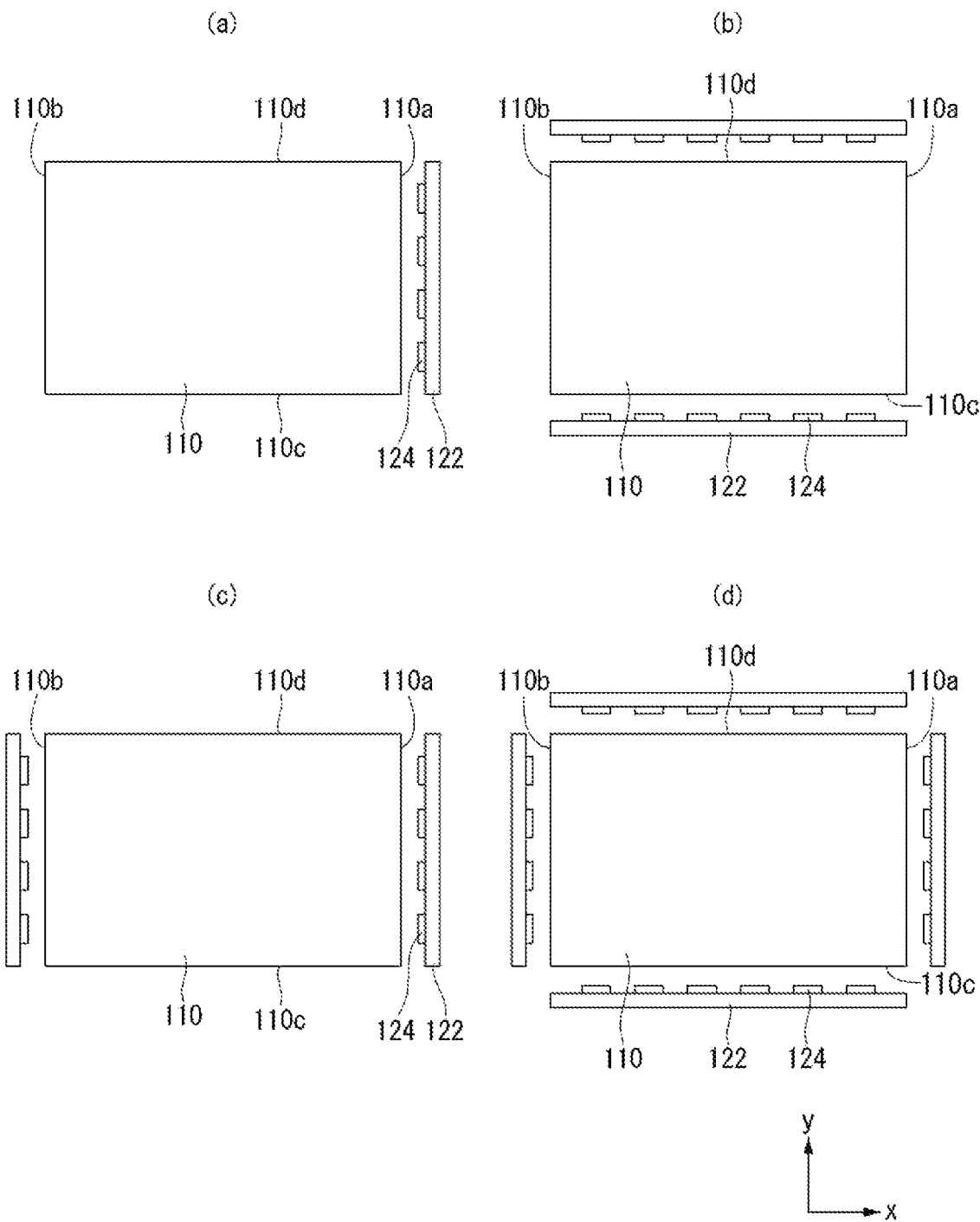

Referring to FIGS. 10 and 11, the substrate 122 and the light assembly 124 can be located in a direction of a lower side surface 110c of the display panel 110. A backlight unit in which the light assembly 124 is disposed at a side surface of the display panel 110 can be referred to as an edge type backlight unit.

As shown in FIG. 10, the light assembly 124 emits light from the lower side surface 110c of the display panel 110 in a direction of an upper side surface 110d. That is, light emitted from the light assembly 124 is diffused from the lower side surface 110c to the upper side surface 110d of the display panel 110 to emit the entire display panel 110. However, the present invention is not limited thereto and the light assembly 124 can be located at the upper side surface 110d of the display panel 110.

As shown in FIG. 11(a), the light assembly 124 can be located at a right side surface 110a of the display panel 110. However, the present invention is not limited thereto and the light assembly 124 can be located at a left side surface 110b of the display panel 110.

As shown in FIG. 11(b), the light assembly 124 can be located at the lower side surface 110c and the upper side surface 110d of the display panel 110. As shown in FIG. 11(c), the light assembly 124 can be located at the right side surface 110a and the left side surface 110b of the display panel 110. As shown in FIGS. 11(b) and 11(c), a backlight unit in which the light assemblies 124 are disposed at opposing both ends of the display panel 110 is referred to as a dual type backlight unit. The dual type backlight unit can easily diffuse light to a front surface of the display panel 110 in even weak light.

As shown in FIG. 11(d), the light assembly 124 can be located at an entire surface of the display panel 110. When the light assembly 124 is located at an entire surface of the display panel 110, the dual type backlight unit can diffuse light more easily than other backlight units.

Figure 12:
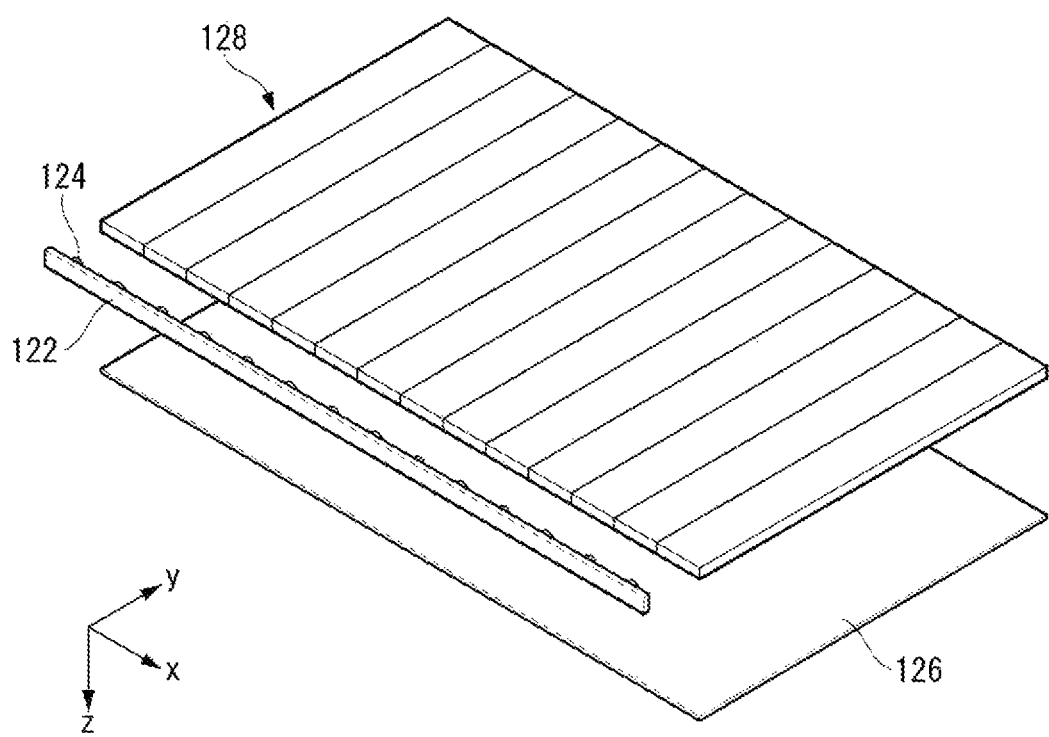
FIG. 12 is a view illustrating a light guide plate according to an embodiment of the present invention.

Next, FIG. 12 is a view illustrating a light guide plate according to an embodiment of the present invention. As shown in FIG. 12, the light guide plate 128 includes a plurality of areas that can be separated. For example, at least one light guide plate 128 can be extended in a first direction (e.g., y direction) parallel to a light emitting direction of the light assembly 124. That is, each light guide plate 128 can be divided in a first direction.

For example, each light guide plate 128 may correspond to a light assembly 124 in a one-to-one fashion. That is, a boundary of the light guide plate 128 and an adjacent light guide plate 128 is located between the light assembly 124 and an adjacent light assembly 124. By cutting a boundary portion, the light guide plate 128 can be separated into plural areas. For example, the light guide plate 128 can be separated into plural areas using a laser.

In addition, the separated light guide plate 128 can be layered on the reflection sheet 126. For example, the separated light guide plate 128 can be attached on the reflection sheet 126 using an adhesive. However, the present invention is not limited thereto and the separated light guide plate 128 can be layered on the reflection sheet 126 using other structures.

Figure 13:
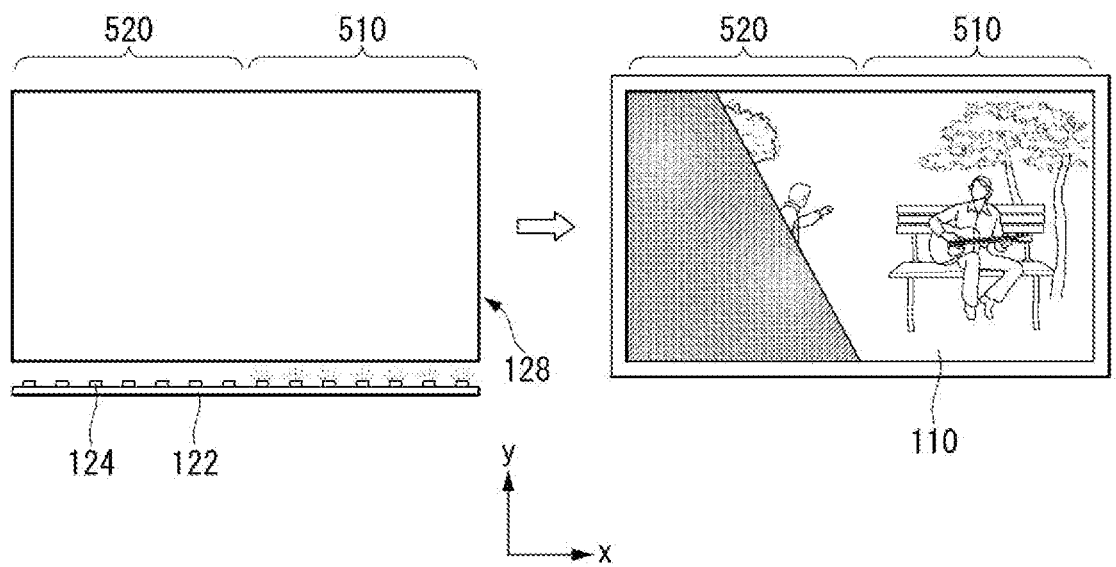
FIG. 13 is a diagram illustrating an effect of a display device according to an embodiment of the present invention.
Figure 13:
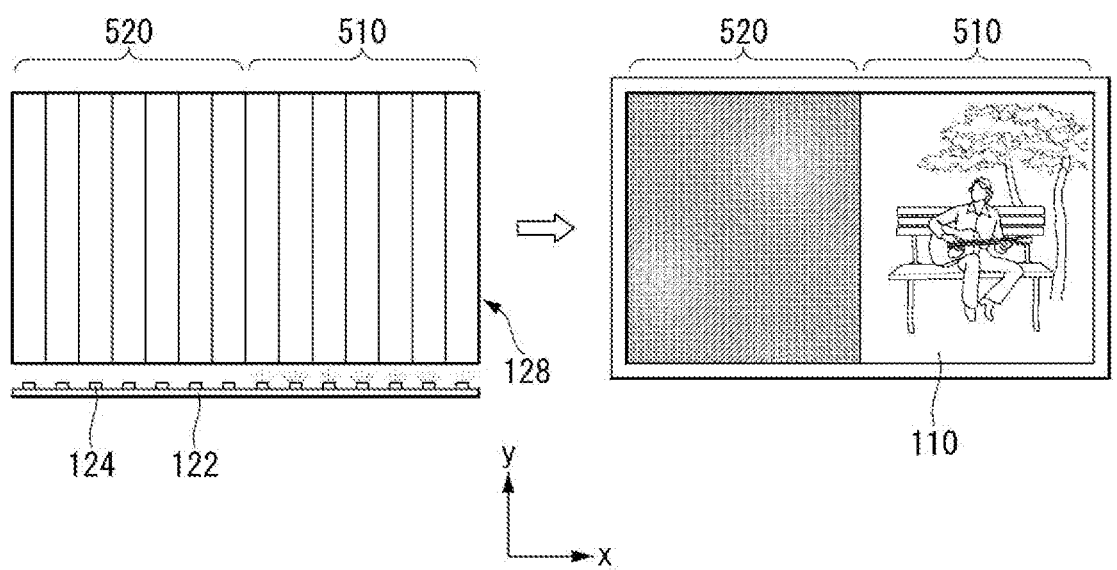

FIG. 13 is a diagram illustrating an effect of a display device according to an embodiment of the present invention. As shown in FIG. 13(a), when applying a local dimming driving method, in the related art light guide plate 128 made of a glass material, light is spread. For example, when driving the partial light assembly 124 in order to drive a first block 510, partial light can be spread to a second block 520. Accordingly, complete local dimming driving cannot be performed.

Alternatively, as shown in FIG. 13(b), the light guide plate 128 including a glass material separated into plural areas can prevent spread of light by a boundary line. For example, when driving the partial light assembly 124 in order to drive the first block 510, light is not spread to the second block 520. Accordingly, a screen is not displayed on the second block 520. That is, complete local dimming driving can be performed.

Figure 14:
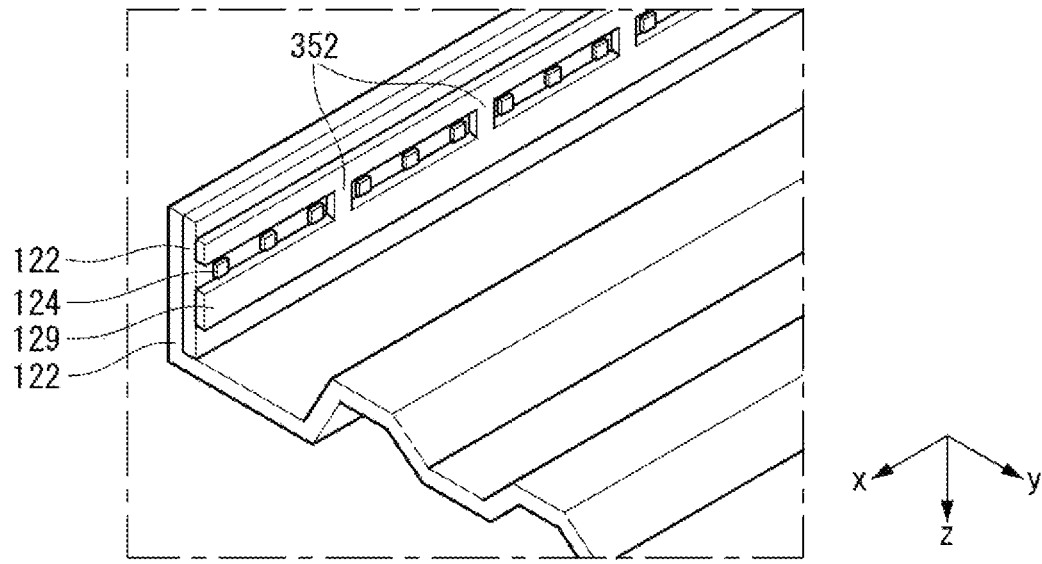
FIGS. 14 to 27 are diagrams illustrating various configurations of a display device according to an embodiment of the present invention.
Figure 14:
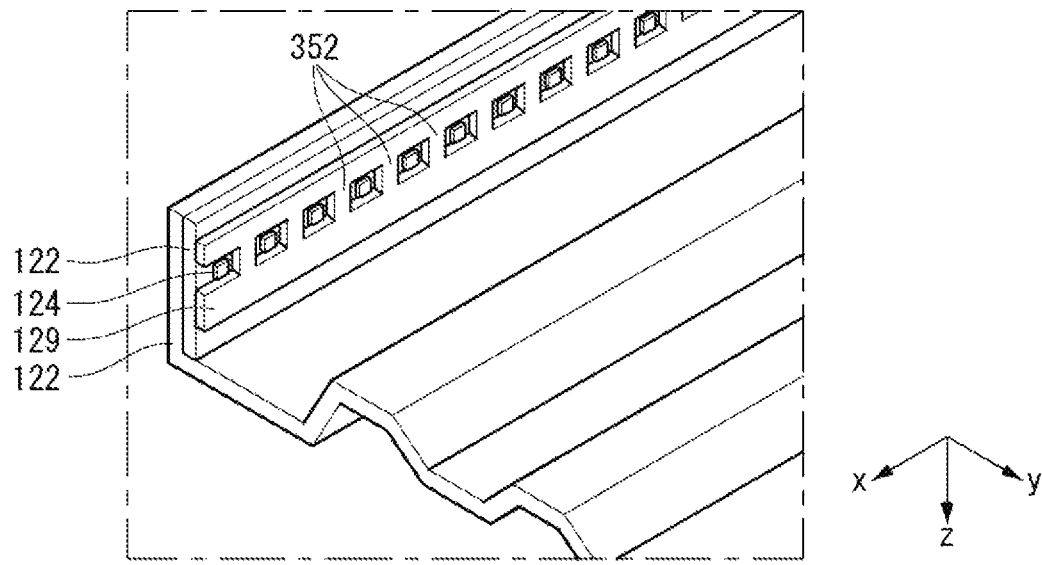

Next, FIGS. 14 to 27 are diagrams illustrating various configurations of a display device according to an embodiment of the present invention. As shown in FIG. 14(a), at the dam pad 129 located on the substrate 122, a blocking film 352 can be located between at least a partial light assembly 124 and an adjacent light assembly 124. The blocking film 352 blocks a portion of light advancing from at least a partial light assembly 124 to the adjacent light assembly 124.

The blocking film 352 can be located at a side surface of the light assembly 124. Further, the blocking film 352 connects the dam pad 129 located at a lower end portion of the light assembly 124 and the dam pad 129 located at an upper end portion of the light assembly 124.

The blocking film 352 can also be located at a boundary of the block. For example, a plurality of light assemblies 124 located at the inside using the blocking film 352 as a boundary can be a plurality of light assemblies 124 corresponding to one block. In this instance, light emitted from one block is not diffused to an adjacent block by the blocking film 352.

As shown in FIG. 14(b), the blocking film 352 can be located at both ends of one light assembly 124. That is, the blocking film 352 can prevent light emitted from each light assembly 124 from being diffused to a side surface. Because the blocking film 352 prevents light from being diffused to correspond to each light assembly 124, local dimming driving can be more minutely performed.

As shown in FIG. 15(a), the dam pad 129 can be located at only a portion in which the blocking film 352 is located. Because the blocking film 352 is located at a boundary of the block, the dam pad 129 can be located at a boundary of the block. Also, because the dam pad 129 is located at a boundary of the block, light in which the light assembly 124 diffuses can be easily diffused within the block and can be blocked to the outside of the block. That is, light advancing to the light assembly 124 adjacent to at least a partial light assembly 124 within the block is not blocked.

Figure 15:
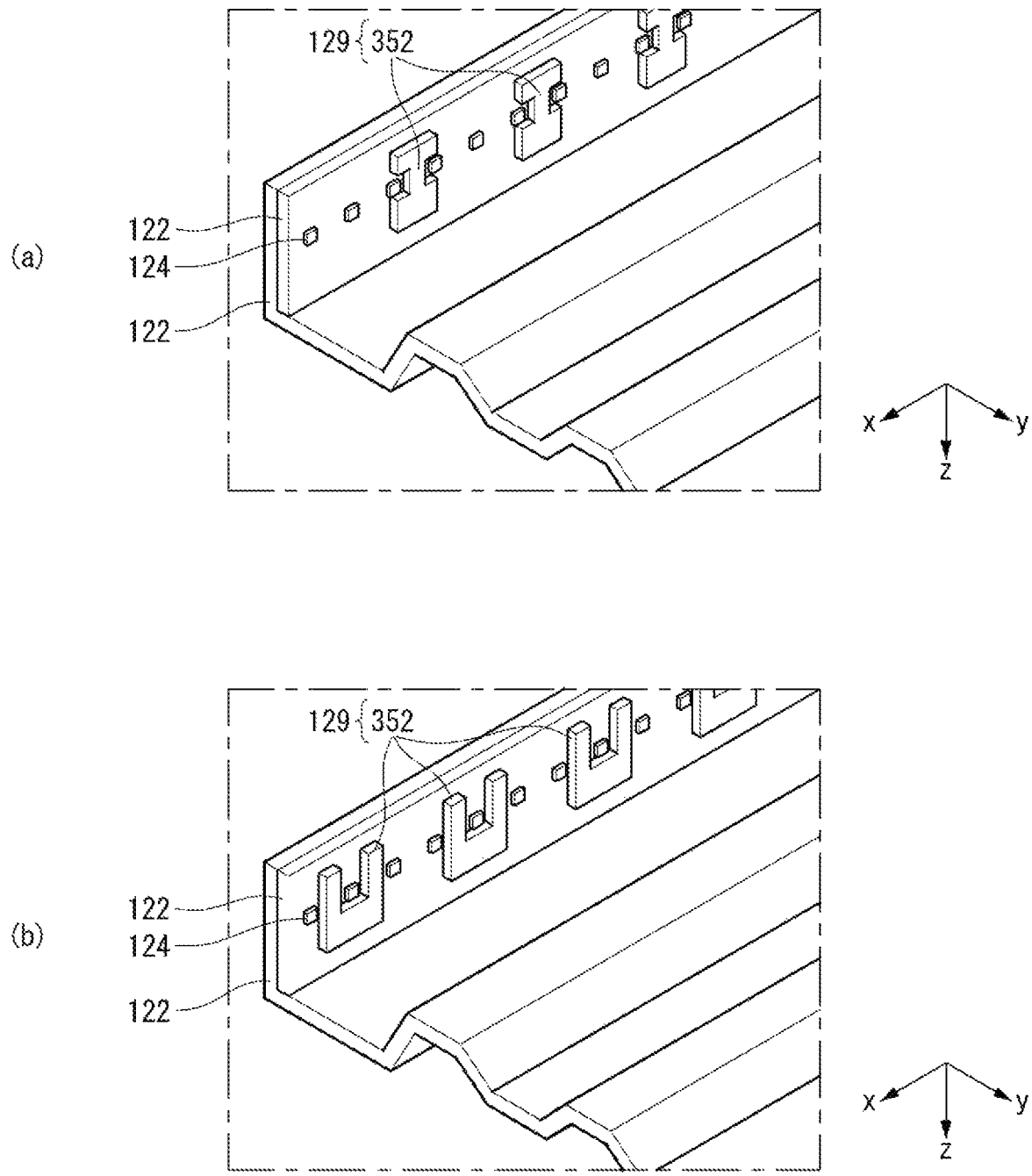

As shown in FIG. 15(*b*), the dam pad 129 can be located at a central portion of the block instead of a boundary of the block. In this instance, the blocking film 352 can be located at both ends of the light assembly 124 located at the central portion of the block. Because the dam pad 129 is located at a central portion of the block instead of the boundary of the block, the dam pad 129 can support a central portion of the separated light guide plate 128. Accordingly, a location of the light guide plate 128 is not twisted, compared with a case of supporting the boundary of the light guide plate 128.

Figure 16:
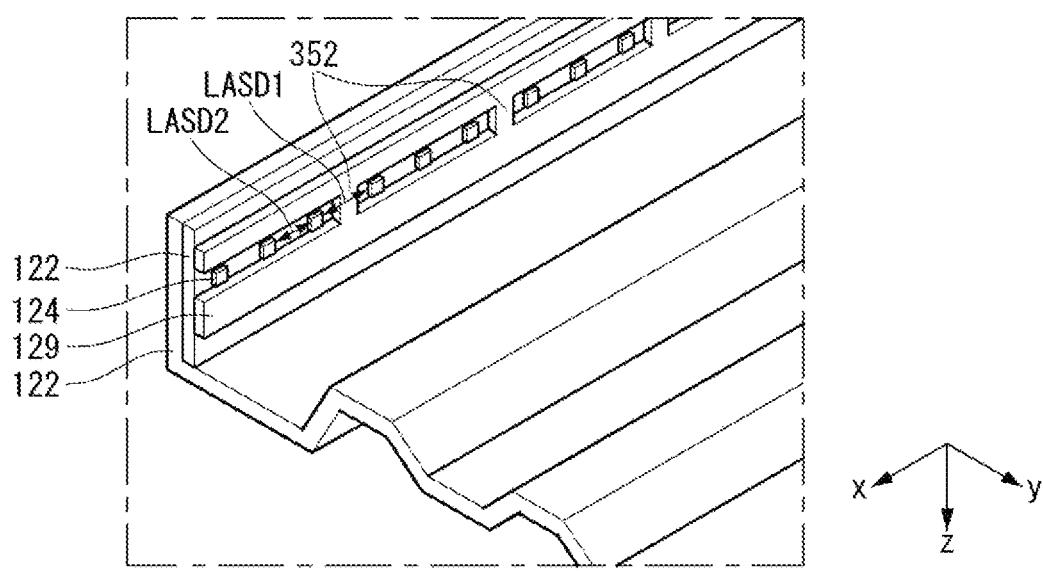

As shown in FIG. 16, a gap LASD1 between the light assemblies 124 adjacent to a portion in which the blocking film 352 is located can be larger than a gap LASD2 between the light assemblies 124 adjacent to other portions. Accordingly, a location space of the blocking film 352 can be secured between the light assemblies 124. Further, when the blocking film 352 is located at a boundary of the block, light advancing to the light assembly 124 of adjacent another block can be reduced. Accordingly, more enhanced local dimming driving can be implemented.

However, the present invention is not limited thereto and a gap LASD1 between the light assemblies 124 adjacent to a portion in which the blocking film 352 is located can be the same as a gap LASD2 between the light assemblies 124 adjacent to other portions. In this instance, the blocking film 352 can be located at a central portion of the block instead of a boundary of the block.

Figure 17:
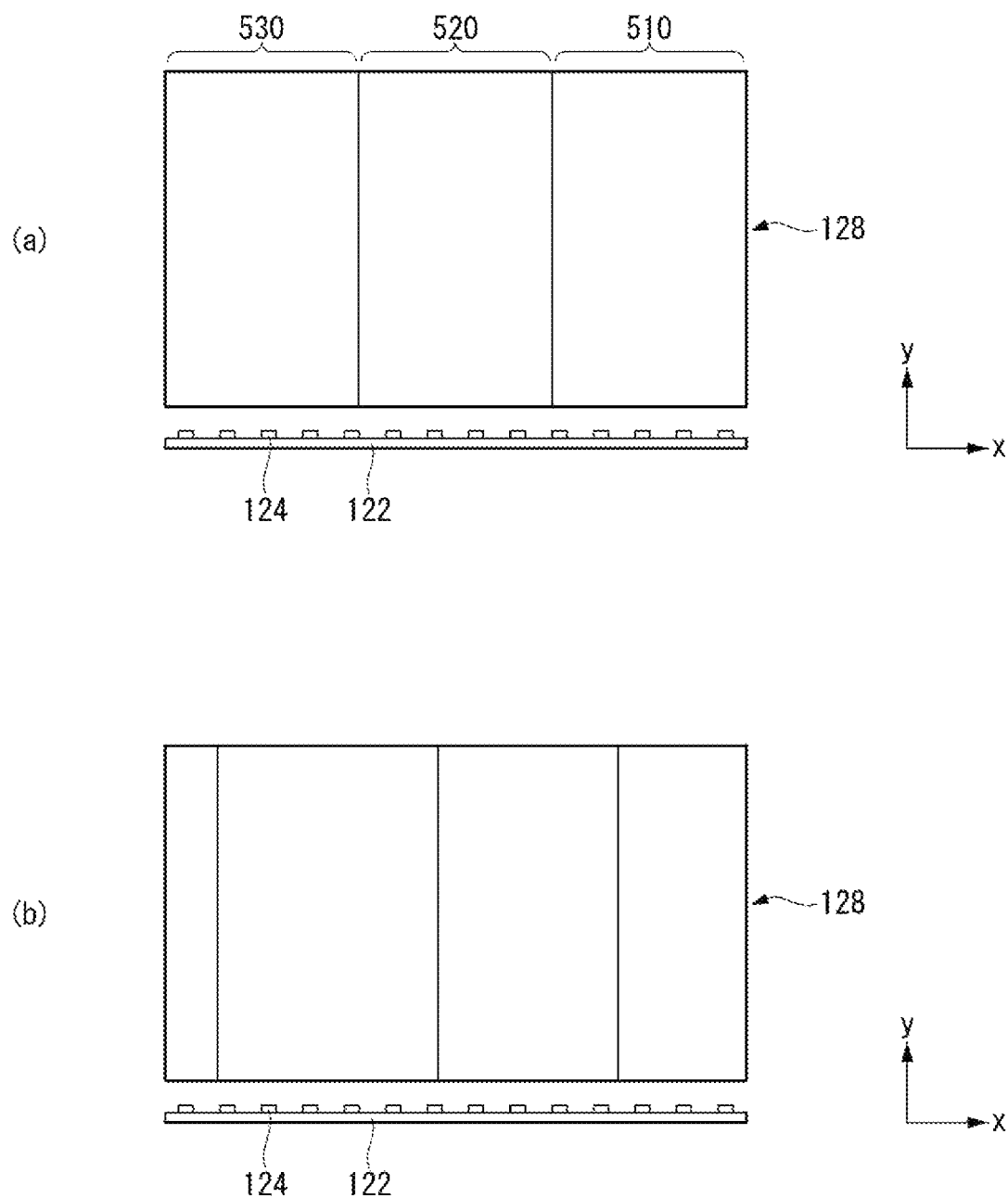

As shown in FIG. 17(*a*), a plurality of light guide plates 128 may not correspond to the respective light assembly 124. That is, at least one light guide plate 128 can correspond to a plurality of light assemblies 124. For example, at least one light guide plate 128 can be separated in the same size as that of a block that can perform local dimming. A boundary of a first block 510 and a second block 520 can be the same as a boundary of the light guide plate 128. Further, a boundary of the second block 520 and a third block 530 can be the same as a boundary of the light guide plate 128.

In the display device according to an embodiment of the present invention, at least one light guide plate 128 may correspond to a plurality of light assemblies 124. Accordingly, the light guide plate 128 is separated into the small number and thus a production process is simplified and a cost can be saved.

As shown in FIG. 17(*b*), at least one light guide plate 128 and at least another one light guide plate 128 can have different widths in a second direction (e.g., x direction) vertical to a light direction. That is, the number of the light assembly 124 corresponding to at least one light guide plate 128 and the number of the light assembly 124 corresponding to at least another light guide plate 128 can be different. In this instance, because a size of each driving block can be adjusted according to a width in a second direction of the light guide plate 128, a user can view more variously divided screen sizes.

Figure 18:
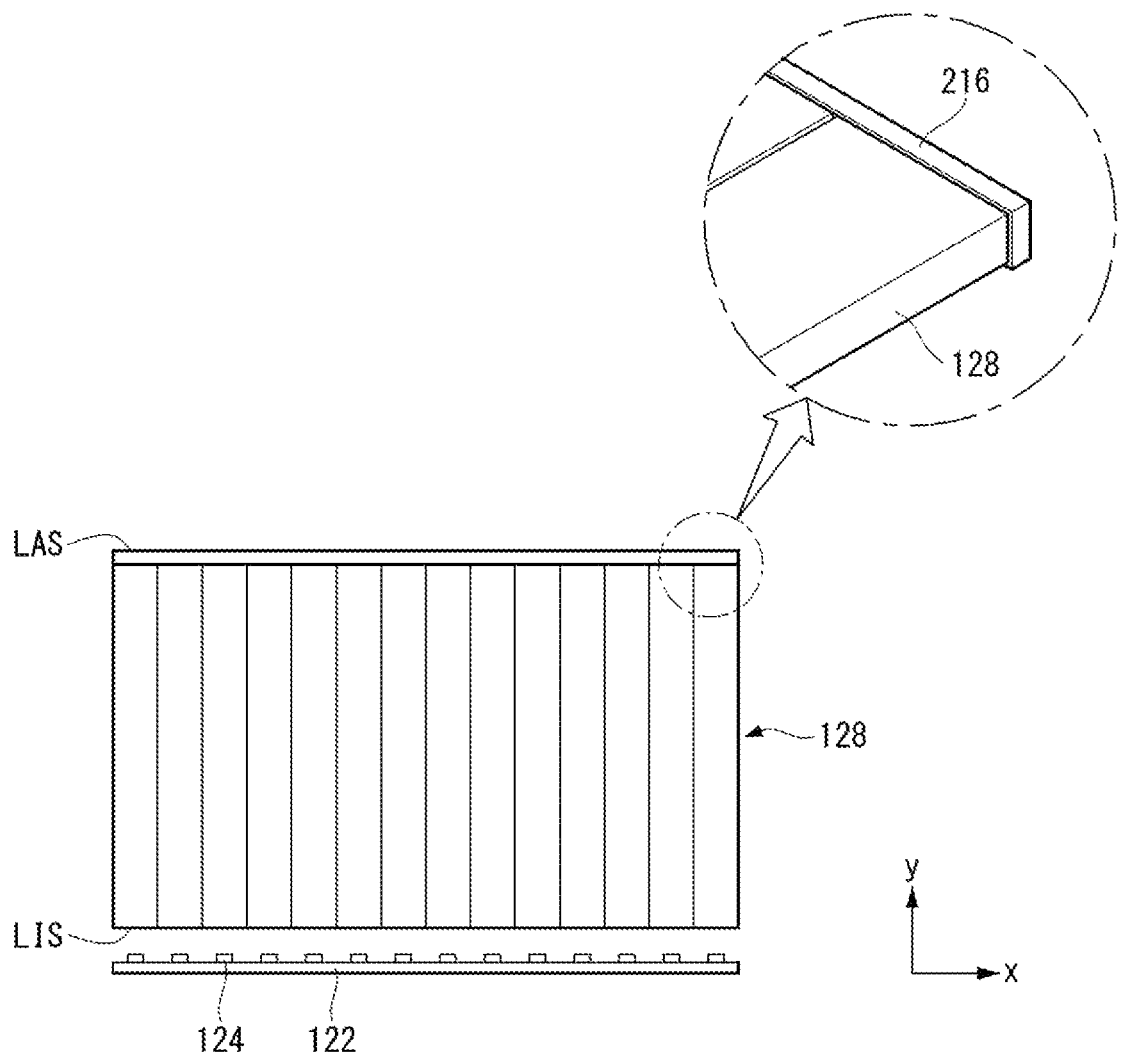

As shown in FIG. 18, the light guide plate 128 may include a light incident surface LIS to which light of the light assembly 124 is applied and a light directional surface LAS to which light applied from the light assembly 124 advances. The light incident surface LIS and the light directional surface LAS may also be opposite to each other. Further, the light incident surface LIS and the light directional surface LAS can be located at opposite ends of the light guide plate 128.

A blocking bracket 216 can shield the light directional surface LAS of the light guide plate 128. That is, the light directional surface LAS of the light guide plate 128 can be inserted into the blocking bracket 126. The blocking bracket 216 can simultaneously shield a plurality of light guide plates 128. That is, the blocking bracket 216 can simultaneously enclose the other ends of a plurality of light guide plates 128. Accordingly, the plurality of light guide plates 128 can be fixed by the blocking bracket 216.

In addition, the plurality of light guide plates 128 can be simultaneously inserted and fixed to the blocking bracket 216. Accordingly, even if the plurality of light guide plates 128 receive an impact from the outside, the plurality of light guide plates 128 are not separated.

Figure 19:
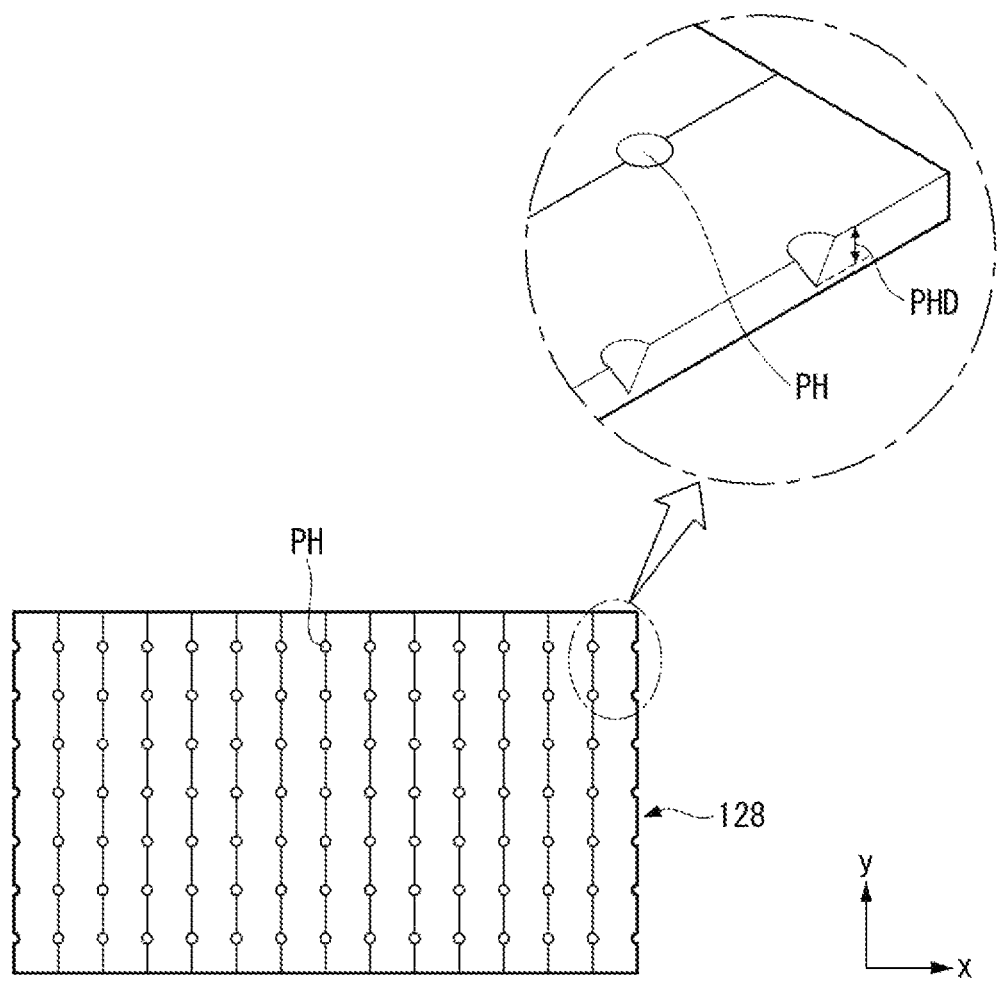

As shown in FIG. 19, a pattern groove PH can be formed on a boundary between adjacent light guide plates 128. The pattern groove PH may have a shape depressed by a predetermined thickness PHD to the inside of the light guide plate 128. The pattern groove PH can be located separately from an adjacent pattern hole PH.

Further, the pattern groove PH can be formed at a boundary of the light guide plate 128. That is, a depressed portion of the pattern groove PH can be divided into a half based on a boundary of the light guide plate 128. The pattern groove PH can also be separately located parallel to a boundary of the light guide plate 128.

By scattering light advancing to the boundary of the light guide plate 128, the pattern groove PH can assist the boundary of the light guide plate 128 not to be displayed on a display screen. Accordingly, the user can view a more neat display screen.

Figure 20:
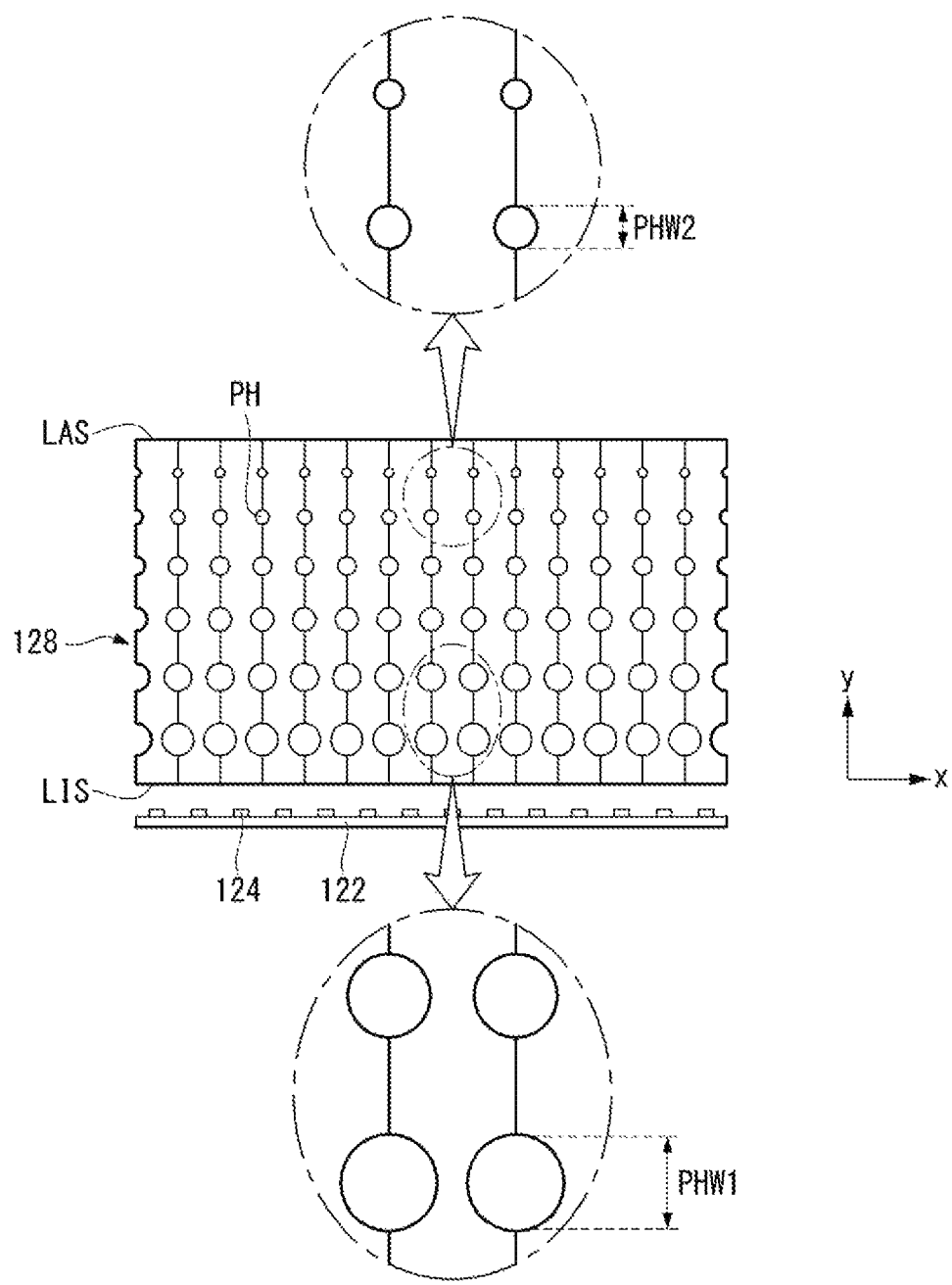

As shown in FIG. 20, a size of the pattern groove PH can be changed according to a location of the light guide plate 128. For example, as the pattern groove PH recedes from the light incident surface LIS of the light guide plate 128, a diameter of the pattern groove PH can be changed. A diameter of the pattern groove PH adjacent to the light incident surface LIS of the light guide plate 128 can be a first diameter PHW1, and a diameter of the pattern groove PH separated from the light incident surface LIS of the light guide plate 128 can be a second diameter PHW2. The first diameter PHW1 can be larger than the second diameter PHW2.

As receding from the light incident surface LIS of the light guide plate 128, a diameter of the pattern groove PH can be reduced. Accordingly, at a boundary between the light guide plates 128 far separated from the light incident surface LIS, scattering occurs less, compared with at a boundary between the light guide plates 128 adjacent to the light incident surface LIS. As receding far from the light incident surface LIS, an incident amount of light reduces and thus as receding far from the light incident surface LIS, scattering less occurs and thus brightness of an entire display screen can become uniform.

Figure 21:
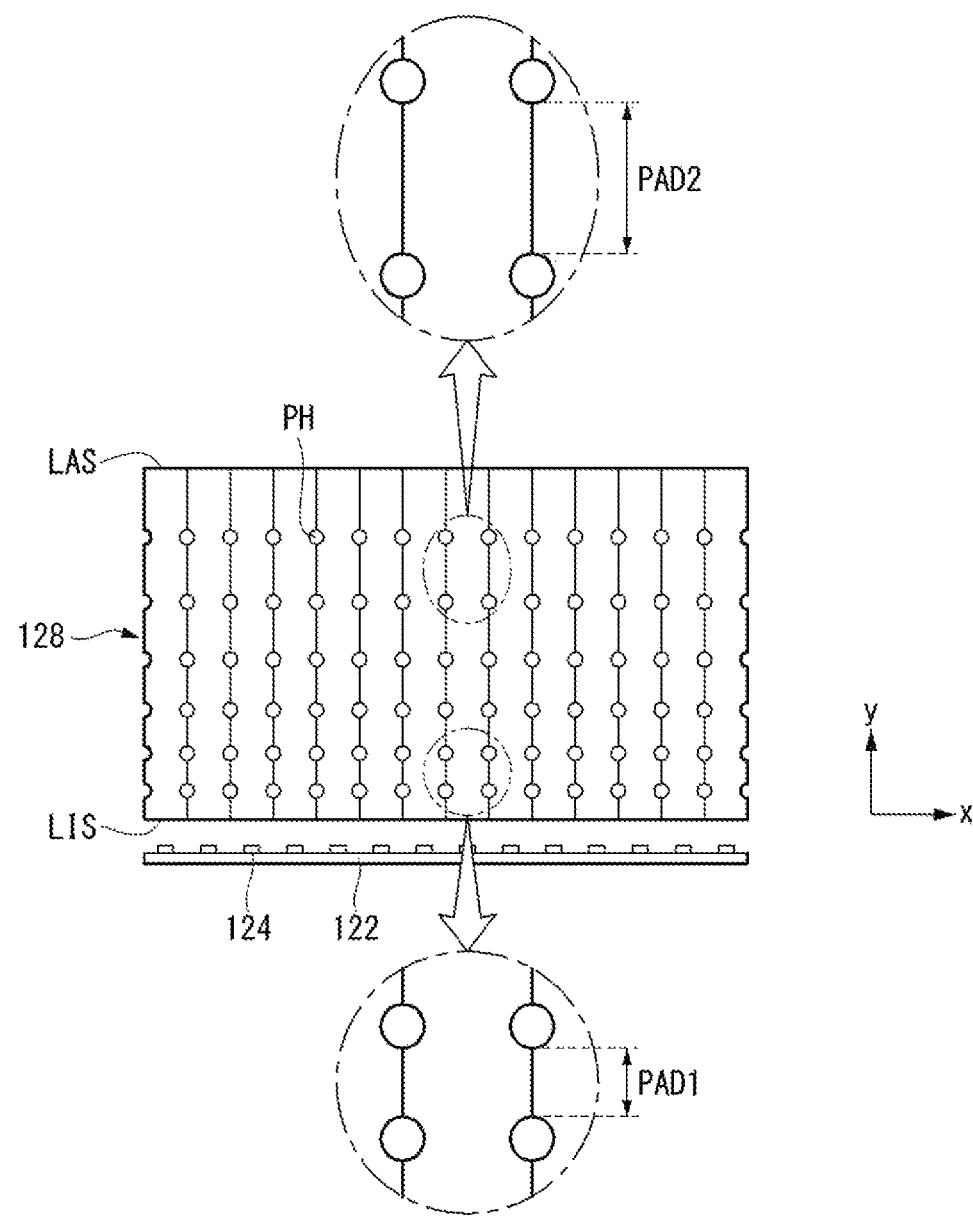

As shown in FIG. 21, a gap between the pattern grooves PH can be changed according to a location of the light guide plate 128. For example, as the pattern groove PH recedes from the light incident surface LIS of the light guide plate 128, a gap between the pattern grooves PH can be changed. A gap between the pattern grooves PH adjacent to the light incident surface LIS of the light guide plate 128 can be a first gap PAD1, and a gap between the pattern grooves PH separated from the light incident surface LIS of the light guide plate 128 can be a second gap PAD2. The first gap PAD1 can be smaller than the second gap PAD2.

As receding from the light incident surface LIS of the light guide plate 128, a gap between the pattern grooves PH may increase. An area of the pattern groove PH per unit area located at a portion separated far from the light incident surface LIS can be smaller than that of the pattern groove PH per unit area located at a portion adjacent to the light incident surface LIS.

Accordingly, at a boundary between the light guide plates 128 separated far from the light incident surface LIS, scattering occurs less, compared with at a boundary between the light guide plates 128 adjacent to the light incident surface LIS. As being separated far from the light incident surface LIS, an incident amount of light reduces, and as being separated far from the light incident surface LIS, scattering occurs less and thus brightness of an entire display screen can become uniform.

Figure 22:
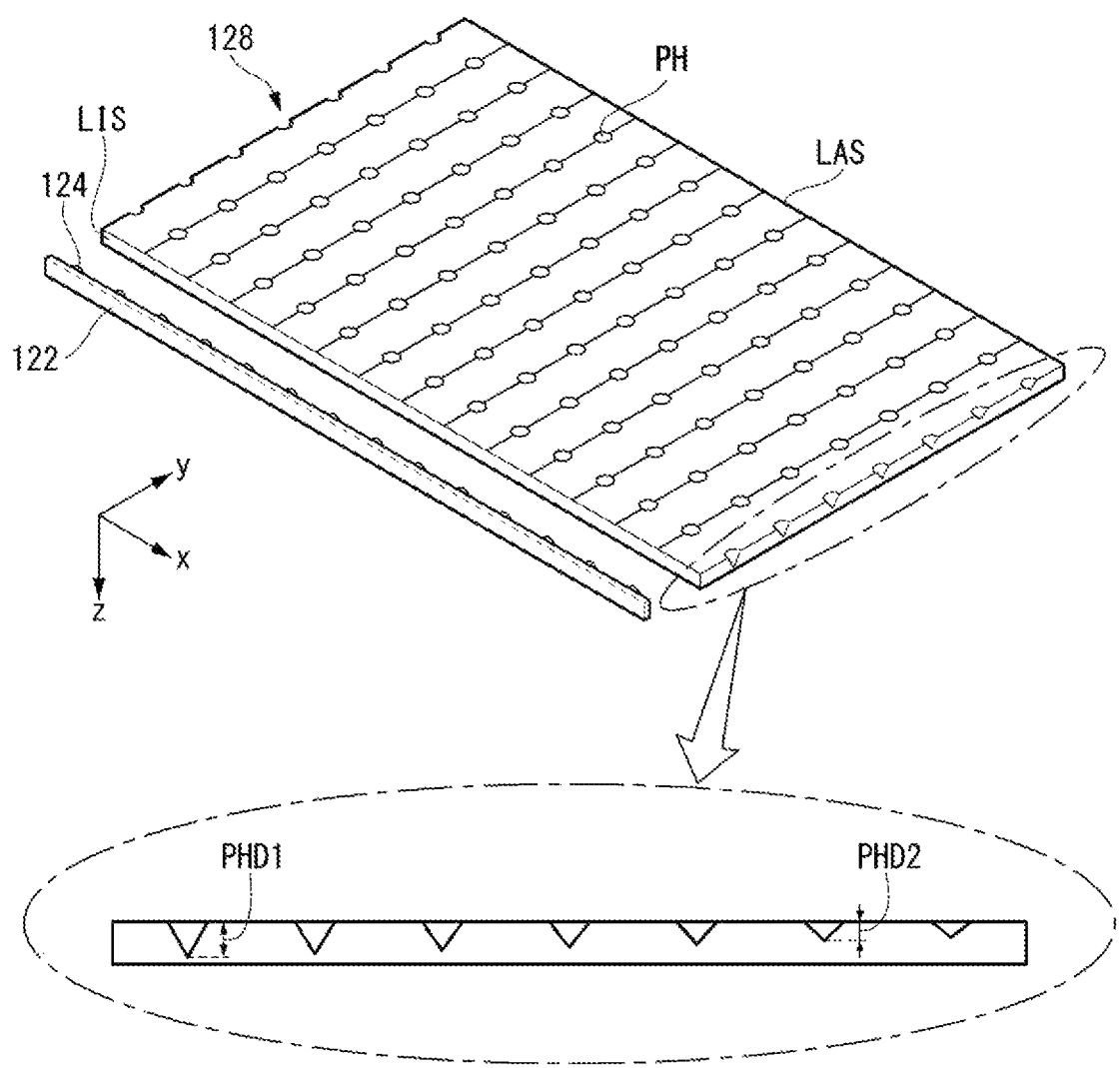

As shown in FIG. 22, a thickness of the pattern groove PH can be changed according to a location of the light guide plate 128. For example, as the pattern groove PH recedes from the light incident surface LIS of the light guide plate 128, a thickness of the pattern groove PH can be changed. A thickness of the pattern groove PH adjacent to the light incident surface LIS of the light guide plate 128 can be a first thickness PHD1, and a thickness of the pattern groove PH separated from the light incident surface LIS of the light guide plate 128 can be a second thickness PHD2. The first thickness PHD1 can be larger than the second thickness PHD2. That is, the pattern groove PH adjacent to the light incident surface LIS can be depressed into the light guide plate 128 further than the pattern groove PH separated from the light incident surface LIS.

As receding from the light incident surface LIS of the light guide plate 128, a thickness of the pattern groove PH can be reduced. Accordingly, at a boundary between the light guide plates 128 far separated from the light incident surface LIS, scattering may occur less, compared with at a boundary between the light guide plates 128 adjacent to the light incident surface LIS. As receding far from the light incident surface LIS, an incident amount of light reduces, and as receding far from the light incident surface LIS, scattering occurs less and thus brightness of an entire display screen can become uniform.

Figure 23:
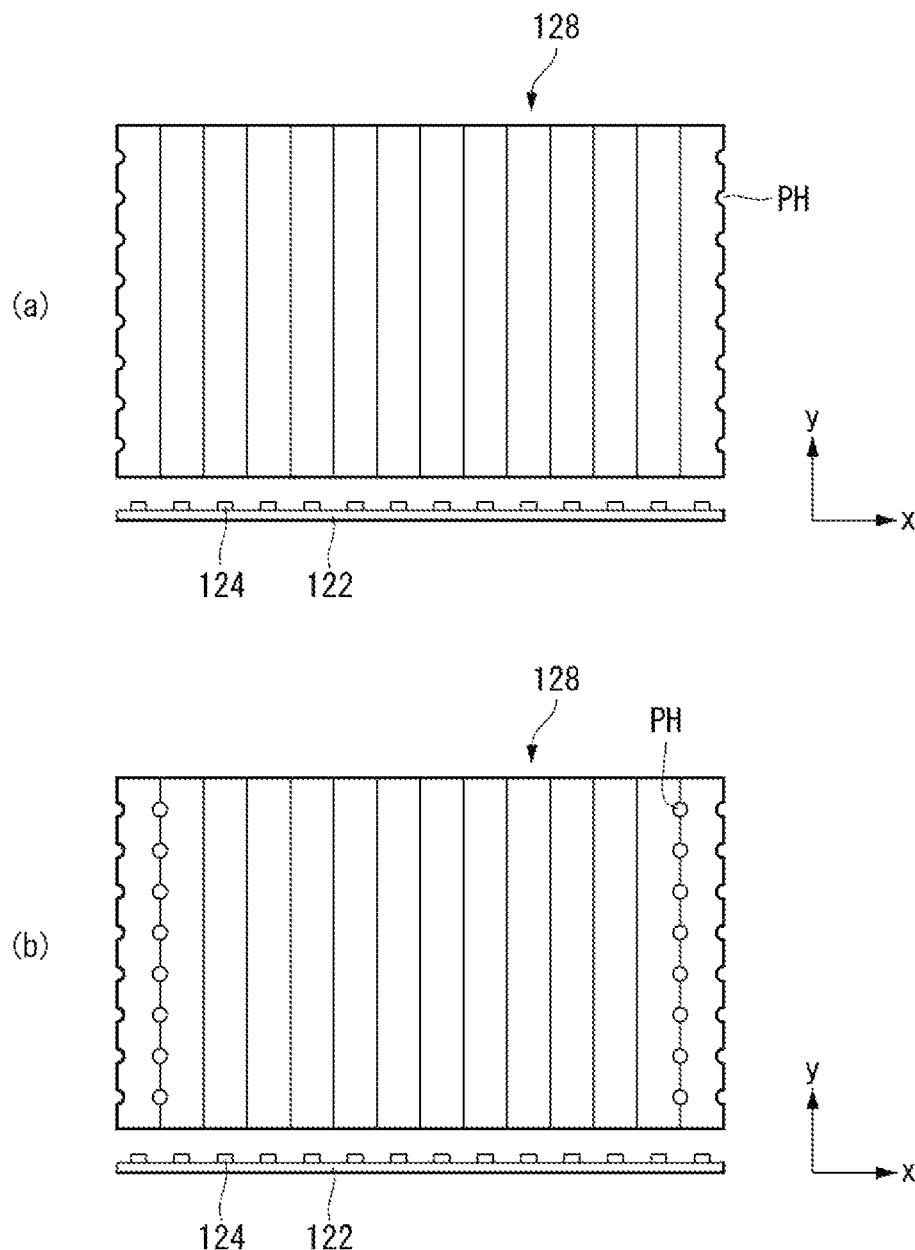

As shown in FIG. 23(*a*), the pattern groove PH can be located at only both ends of an edge of the light guide plate 128. That is, the pattern groove PH can be located at both ends of a second direction (e.g., x direction) vertical to a light direction of the light guide plate 128. At another portion of the light guide plate 128, the pattern groove PH may not be located. The pattern groove PH located at the left and the right of the light guide plate 128 can prevent light reflected from a structure located at the outside of the light guide plate 128 from being concentrated at both ends of the light guide plate.

In the display device according to an embodiment of the present invention, the pattern groove PH can be located at only both ends of the light guide plate. Accordingly, as the number of the pattern groove PH reduces, a production process is simplified and a cost can be saved.

As shown in FIG. 23(*b*), the pattern groove PH can be located at both ends of the light guide plate 128 and a boundary adjacent to the both ends. That is, the pattern groove PH can be located on both ends of a second direction and a boundary adjacent to the both ends. In this instance, light can be prevented from being concentrated, compared with when the pattern groove PH is located at an edge of both ends. In addition, because the pattern groove PH is not located at a central portion of the light guide plate, the number of the pattern groove PH reduces and thus a production process is simplified and a cost can be saved.

Figure 24:
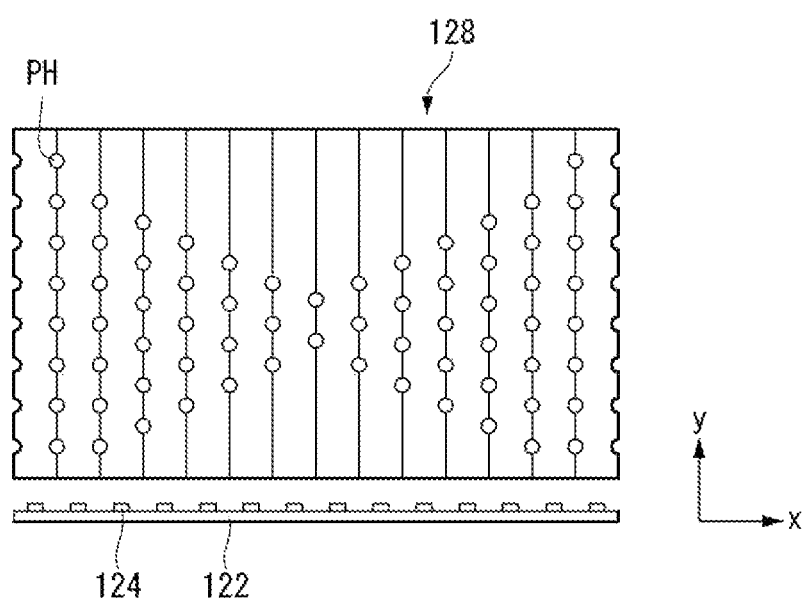

As shown in FIG. 24, the number of the pattern groove PH located at a boundary of the light guide plate 128 can be reduced as advancing to a central portion of the light guide plate PH. That is, the pattern groove PH located at a boundary of the light guide plate 128 can be reduced as advancing from both ends of a second direction to the central portion.

Because the pattern groove PH located at the central portion of the light guide plate 128 exists more than the pattern groove PH located at an edge of the light guide plate 128, light reflected from a structure located at the outside of the light guide plate 128 can be prevented from concentrating at both ends of the light guide plate 128. In this instance, because the pattern groove PH is more evenly distributed, compared with a case in which the pattern groove PH is not located at the central portion of the light guide plate 128, light can be more uniformly diffused.

Figure 25:
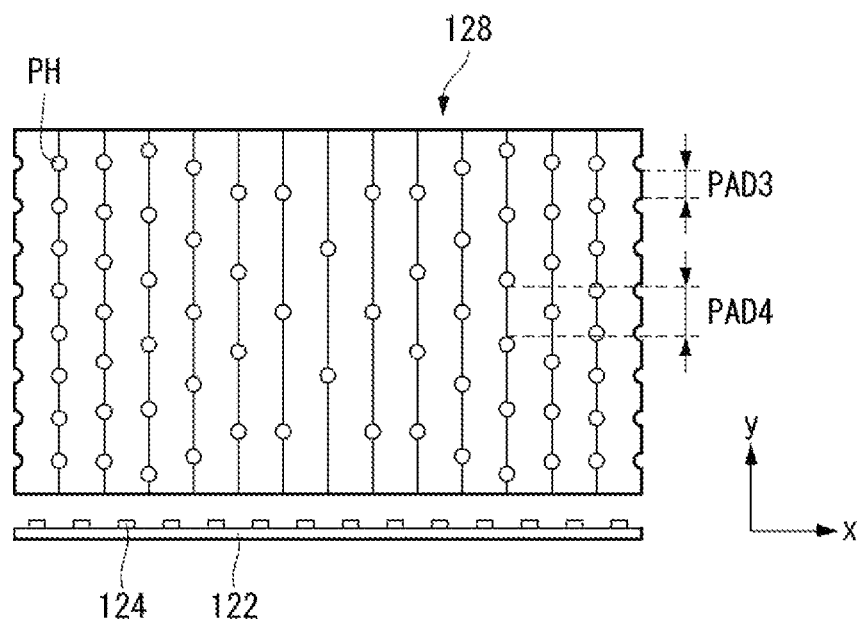

As shown in FIG. 25, a gap between the pattern grooves PH located at a boundary of the light guide plate 128 can increase as advancing to the central portion of the light guide plate 128. That is, a gap between the pattern grooves PH located at a boundary of the light guide plate 128 can increase as advancing from both ends of a second direction to a central portion.

For example, a third gap PAD3, which is a gap between the pattern grooves PH located at a boundary of both ends of the light guide plate 128 can be larger than a fourth gap PAD4, which is a gap between the pattern grooves PH located at an internal boundary of the light guide plate 128. Accordingly, an area of a pattern groove PH per unit area located at a boundary of both ends of the light guide plate 128 can be larger than that of a pattern groove PH per unit area located at an internal boundary of the light guide plate 128.

Because a gap between the pattern grooves PH located at a boundary of the light guide plate 128 increases as advancing to the central portion of the light guide plate 128, light reflected from a structure located at the outside of the light guide plate 128 can be prevented from being concentrated at both ends of the light guide plate 128.

Figure 26:
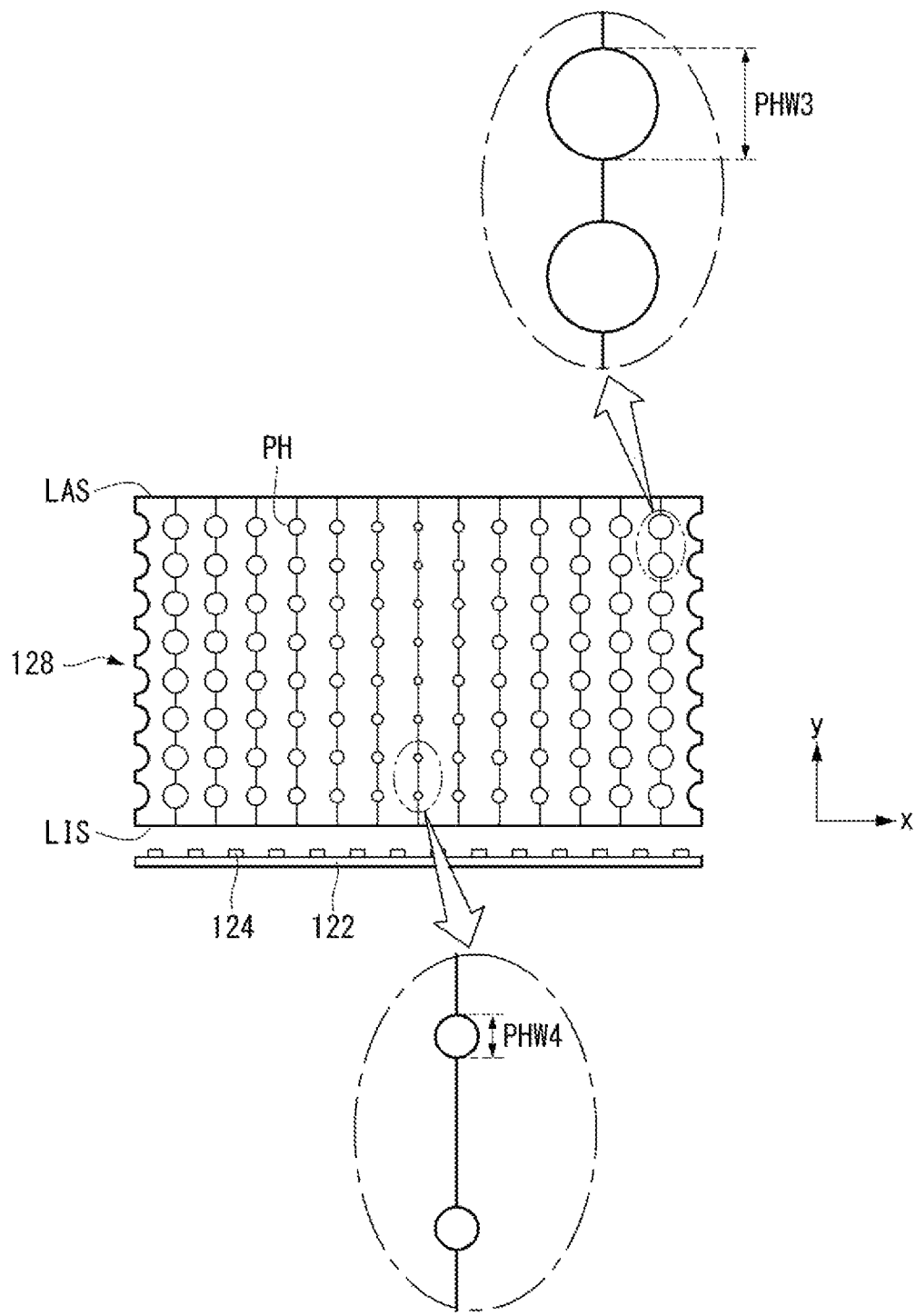

As shown in FIG. 26, a diameter of the pattern groove PH located at a boundary of the light guide plate 128 can decrease as advancing to a central portion of the light guide plate 128. That is, a diameter of the pattern groove PH located at a boundary of the light guide plate 128 can decrease as advancing from both ends of a second direction to a central portion.

For example, a third diameter PHW3, which is a diameter of the pattern groove PH located at a boundary of both ends of the light guide plate 128 can be larger than a fourth diameter PHW4, which is a diameter of the pattern groove PH located at an internal boundary of the light guide plate 128. Accordingly, light reflected from a structure located at the outside of the light guide plate 128 can be prevented from concentrating at both ends of the light guide plate 128.

Figure 27:
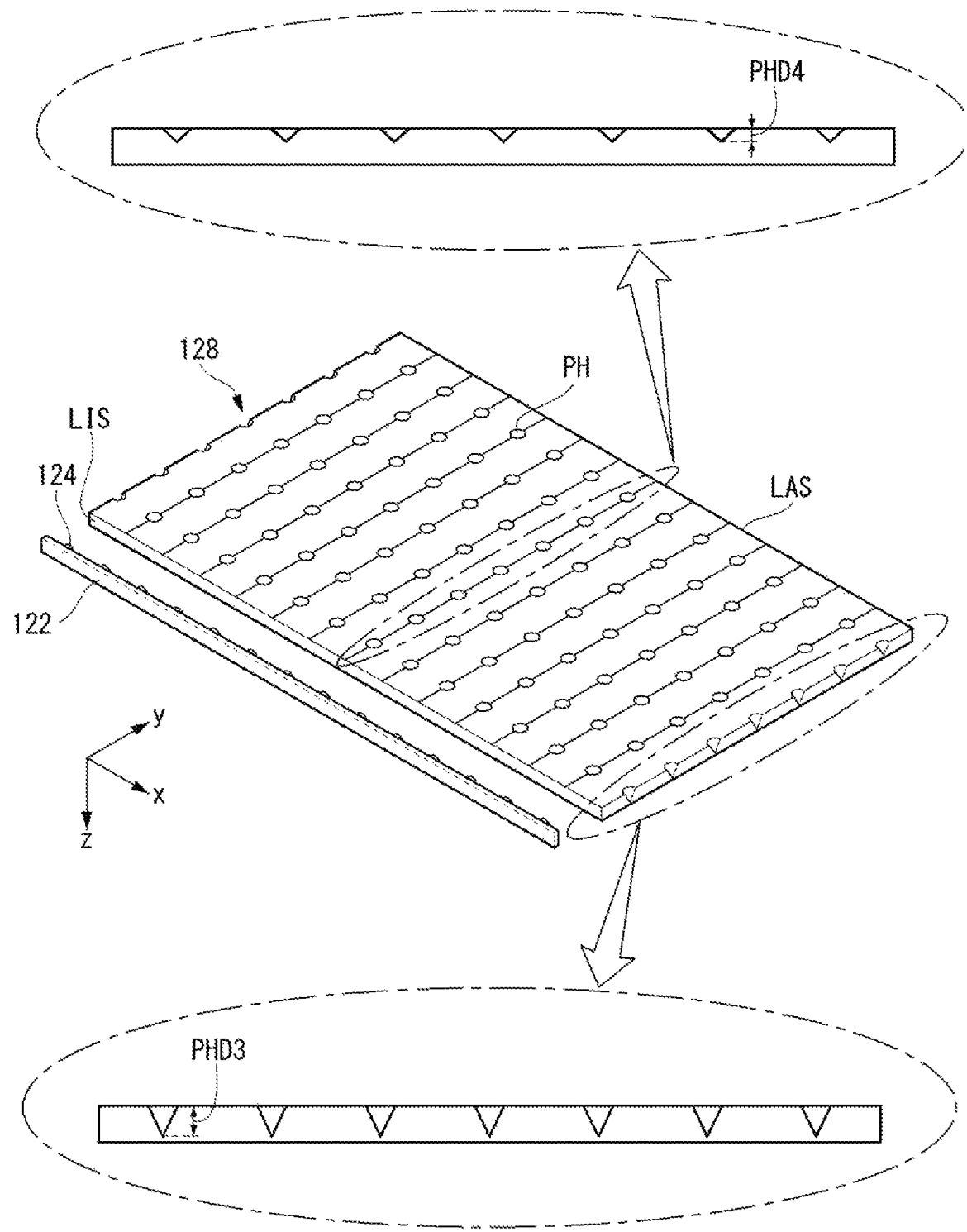

As shown in FIG. 27, a thickness of the pattern groove PH located at a boundary of the light guide plate 128 can decrease as advancing to a central portion of the light guide plate 128. That is, a thickness of the pattern groove PH located at a boundary of the light guide plate 128 can decrease as advancing from both ends of a second direction to a central portion.

For example, a third thickness PHD3, which is a thickness of the pattern groove PH located at a boundary of both ends of the light guide plate 128 can be larger than a fourth thickness PHD4, which is a thickness of the pattern groove PH located at an internal boundary of the light guide plate 128. Accordingly, light reflected from a structure located at the outside of the light guide plate 128 can be prevented from concentrating at both ends of the light guide plate 128.

Figure 28:
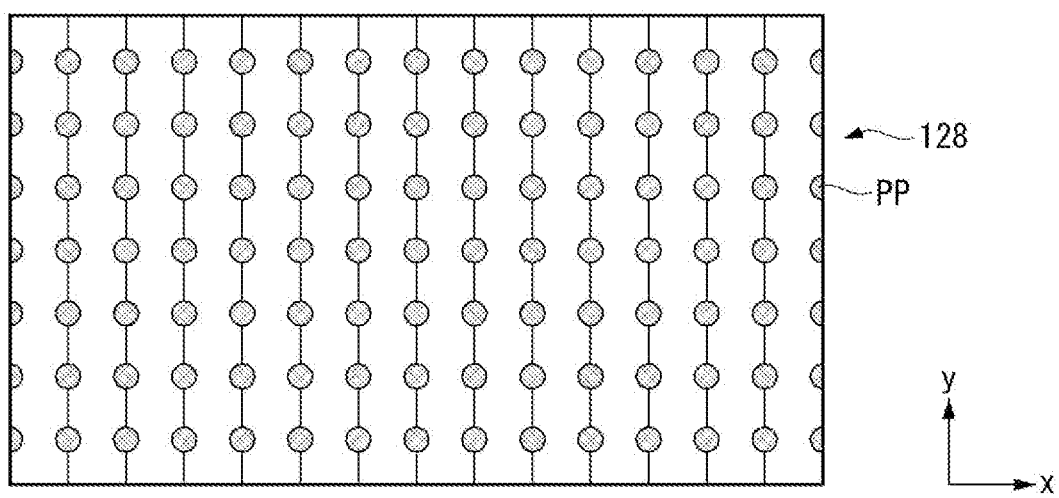
FIGS. 28 and 29 are diagrams illustrating a light guide plate according to another embodiment of the present invention.
Figure 29:
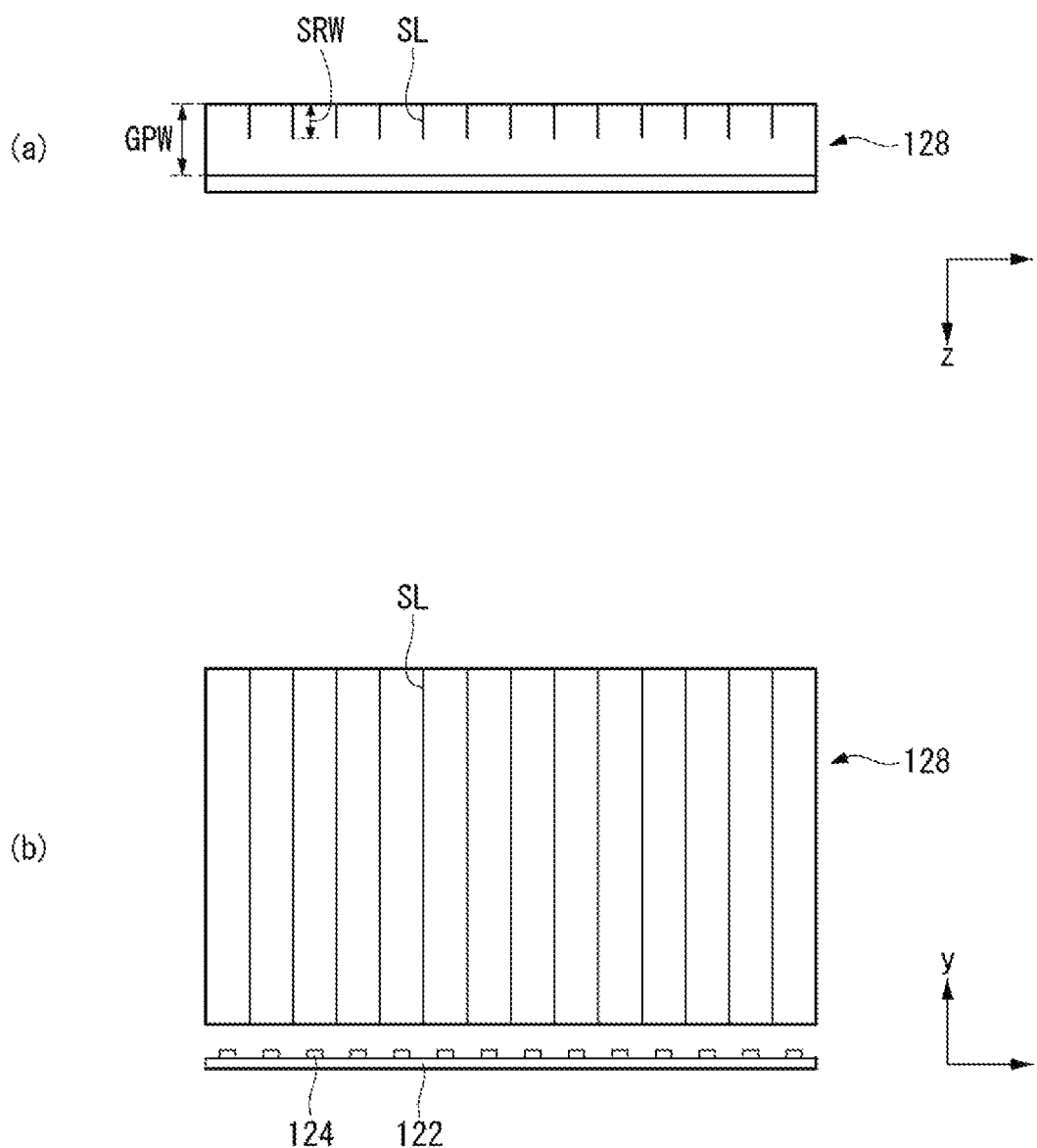

Next, FIGS. 28 and 29 are diagrams illustrating a light guide plate according to another embodiment of the present invention. As shown in FIG. 28, on a boundary of at least one light guide plate 128 and an adjacent light guide plate 128, a print pattern PP can be printed. The print pattern PP is not depressed into the light guide plate 128 and can be printed in a circular shape on a boundary of the light guide plate 128. The print pattern PP can be located separately from the adjacent print pattern PP.

The print pattern PP can be formed at a boundary of the light guide plate 128. That is, a shape of the print pattern PP can be divided into a half based on a boundary of the light guide plate 128. Further, the print pattern PP can be located separately from the adjacent print pattern PP.

The print pattern PP may include a dark-based color. For example, the print pattern PP may have a black color. Accordingly, a portion at which the print pattern PP is located can prevent light from being scattered. By scattering light advancing to a boundary of the light guide plate 128, the print pattern PP can assist the boundary of the light guide plate 128 not to display on a display screen. Accordingly, the user can view a more neat display screen.

As shown in FIGS. 29(*a*) and 29(*b*), the light guide plate 128 can also not be divided into the plural. In more detail, a scribing line SL can be formed on the light guide plate 128. The scribing line SL can be a line formed by being depressed into the light guide plate 128. A width SRW of the scribing line SL in a thickness direction of the light guide plate 128 can be smaller than a thickness GPW of the light guide plate 128. Accordingly, the light guide plate 128 is not divided into the plural and the scribing line SL can be carved on the light guide plate 128. The scribing line SL may divide the light guide plate 128 into a plurality of areas.

The scribing line SL can be extended in a first direction parallel to a light emitting direction of the light assembly 124. Accordingly, when viewing the light guide plate 128 from the top, it can be shown as the light guide plate 128 is divided by the scribing line SL. An area of each light guide plate 128 divided by the scribing line SL may correspond to the light assembly 124. However, the present invention is not limited thereto and an area of the light guide plate 128 divided by the scribing line SL may correspond to a plurality of light assemblies 124.

In the display device according to an embodiment of the present invention, the light guide plate 128 is not divided into the plural, but only a scribing line SL can be formed. Accordingly, danger in which the light guide plate 128 is separated from a location by an external impact can be reduced and a production cost can be reduced. In addition, a pattern groove can be formed on the scribing line SL, and a shape of a pattern groove according to a location can be changed, as described above.

The foregoing embodiments are merely examples and are not to be considered as limiting the present disclosure. The present teachings can be readily applied to other types of methods and apparatuses. The features, structures, methods, and other characteristics of the embodiments described herein can be combined in various ways to obtain additional and/or alternative embodiments. Certain embodiments or other embodiments of the invention described above are not mutually exclusive or distinct from each other. Any or all elements of the embodiments of the invention described above can be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit, comprising:
    a frame including a back plate and a side wall extended forward from the back plate, the side wall extended along an edge of the back plate;
    a substrate coupled to the side wall and extended along the edge of the back plate;
    a plurality of light assemblies mounted on the substrate and arranged along the edge of the back plate; and
    a plurality of light guide blocks arranged along the edge of the back plate and separated from each other for preventing spreading of light,
    wherein at least one of the plurality of light guide blocks includes a plurality of pattern holes at a boundary thereof,
    wherein at least one of the plurality of pattern holes is divided into half by the boundary, and
    wherein the plurality of light guide blocks are formed of glass.

2. The backlight unit of claim 1, further comprising:
    a blocking bracket that inserts one end of the plurality of light guide blocks.

3. The backlight unit of claim 1, further comprising a blocking bracket covering the plurality of light guide blocks, wherein the plurality of light guide blocks comprises:
    a first surface facing the plurality of light assemblies; and
    a second surface opposite to the first surface, and
    wherein the blocking bracket shields the second surface.

4. The backlight unit of claim 3, wherein the plurality of holes is formed on a front surface of the guide block, and
    wherein the plurality of holes is arranged in a direction away from the plurality of light assemblies.

5. The backlight unit of claim 4, wherein the plurality of holes have a predetermined shape carved with a predetermined depth into the light guide block.

6. The backlight unit of claim 4, wherein a diameter of each of the plurality of holes is reduced as a distance of each of the plurality of holes from the first surface is increased.

7. The backlight unit of claim 4, wherein a depth of each of the plurality of holes is reduced as a distance of each of the plurality of holes from the first surface is increased.

8. The backlight unit of claim 4, wherein a gap between subsequent holes of the plurality of holes increases as a distance from the first surface is increased.

9. The backlight unit of claim 1, further comprising a reflection sheet located between the plurality of light guide blocks and the frame and configured to reflect light emitted by the plurality of light assemblies,
    wherein the plurality of light guide blocks is attached to the reflection sheet through an adhesive.

10. The backlight unit of claim 1, wherein the plurality of light guide blocks extends in a direction perpendicular to the one side of the frame.

11. The backlight unit of claim 10, wherein at least two of the plurality of light guide blocks are in contact with each other.

12. The backlight unit of claim 10, wherein at least two of the plurality of light guide blocks are spaced apart from each other.

13. The backlight unit of claim 1, further comprising a blocking bracket opposite to the substrate,
   wherein the blocking bracket is connected to each of the plurality of light guide blocks.

14. The backlight unit of claim 13, wherein a portion of the plurality of light guide blocks is inserted into the blocking bracket.

\* \* \* \* \*